US011511186B2

(12) United States Patent
VanWyk et al.

(10) Patent No.: US 11,511,186 B2
(45) Date of Patent: Nov. 29, 2022

(54) CONTROLLER WITH SENSOR-RICH CONTROLS

(71) Applicant: Valve Corporation, Bellevue, WA (US)

(72) Inventors: Eric Judson VanWyk, Seattle, WA (US); Lucas Allen Whipple, Seattle, WA (US); Walter Petersen, Seattle, WA (US); Jeffrey Walter Mucha, Sammamish, WA (US); Scott Dalton, Seattle, WA (US); Pierre-Loup Miguel Griffais, Mercer Island, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/174,167

(22) Filed: Feb. 11, 2021

(65) Prior Publication Data
US 2021/0252388 A1 Aug. 19, 2021

Related U.S. Application Data

(60) Provisional application No. 62/977,030, filed on Feb. 14, 2020.

(51) Int. Cl.
*A63F 13/24* (2014.01)
*G06F 3/0354* (2013.01)
(Continued)

(52) U.S. Cl.
CPC ............ *A63F 13/24* (2014.09); *A63F 13/214* (2014.09); *A63F 13/218* (2014.09);
(Continued)

(58) Field of Classification Search
CPC ...... A63F 13/24; A63F 13/214; A63F 13/218; A63F 13/285; A63F 2300/1037; A63F 2300/1056; A63F 2300/1043; A63F 2300/1068; G06F 3/016; G06F 3/0338; G06F 3/03547
See application file for complete search history.

(56) References Cited

U.S. PATENT DOCUMENTS

| | | |
|---|---|---|
| 6,570,078 B2 | 5/2003 | Ludwig |
| 8,754,746 B2 | 6/2014 | Lukas et al. |

(Continued)

OTHER PUBLICATIONS

The PCT Search Report and Written Opinion for PCT Application No. PCT/US21/17926, dated Apr. 29, 2021, 9 pages.

(Continued)

*Primary Examiner* — Omkar A Deodhar
*Assistant Examiner* — Shauna-Kay Hall
(74) *Attorney, Agent, or Firm* — Lee & Hayes, P.C.

(57) ABSTRACT

Described herein are controllers with sensor-rich controls for enhanced controller functionality. An example control may include a pressure sensor that is configured to detect an amount of a force of a press on a cover of the control based at least in part on a proximity of a metal layer to the pressure sensor. This control may further include a touch sensor for detecting an object contacting the cover of the control. Additional embodiments disclose, among other things, integrated trackpads and D-pads, as well as backlighting features that indicate a functional state of the controller.

21 Claims, 21 Drawing Sheets

(51) Int. Cl.
*G06F 3/01* (2006.01)
*G06F 3/0338* (2013.01)
*A63F 13/214* (2014.01)
*A63F 13/285* (2014.01)
*A63F 13/218* (2014.01)

(52) U.S. Cl.
CPC ............ *A63F 13/285* (2014.09); *G06F 3/016* (2013.01); *G06F 3/0338* (2013.01); *G06F 3/03547* (2013.01); *A63F 2300/1037* (2013.01); *A63F 2300/1043* (2013.01); *A63F 2300/1056* (2013.01); *A63F 2300/1068* (2013.01)

(56) References Cited

U.S. PATENT DOCUMENTS

| | | |
|---|---|---|
| 9,950,256 B2 | 4/2018 | Lim |
| 10,427,035 B2 | 10/2019 | Schmitz et al. |
| 10,441,881 B2 | 10/2019 | Burgess et al. |
| 2006/0111180 A1 | 5/2006 | Cheng |
| 2008/0261695 A1 | 10/2008 | Coe |
| 2009/0205878 A1 | 8/2009 | Taylor |
| 2012/0327025 A1 | 12/2012 | Huska et al. |
| 2013/0038981 A1 | 2/2013 | Imanaka et al. |
| 2013/0100021 A1 | 4/2013 | Larsen et al. |
| 2015/0105152 A1* | 4/2015 | Bellinghausen .... A63F 13/2145 463/31 |
| 2017/0123516 A1* | 5/2017 | Li ........................... G08C 23/04 |
| 2017/0189800 A1 | 7/2017 | Crain |
| 2017/0239559 A1 | 8/2017 | Igarashi et al. |
| 2019/0073036 A1 | 3/2019 | Bernstein et al. |
| 2019/0265834 A1 | 8/2019 | Rosenberg et al. |

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.

WICO Corporation Consumer Division Manual for "WICO Command Control" Trackball controller, 1982, 6 pages.

* cited by examiner

CONTROLLER WITH SENSOR-RICH CONTROLS

CROSS REFERENCE TO RELATED APPLICATION

This application claims priority to commonly assigned U.S. Provisional Patent Application Ser. No. 62/977,030, entitled "CONTROLLER WITH SENSOR-RICH CONTROLS," and filed on Feb. 14, 2020, the entirety of which is incorporated herein by reference.

BACKGROUND

Handheld controllers are used in an array of architectures for providing input, for example, to a local or remote computing device. For instance, handheld controllers are utilized in the gaming industry to allow players to interact with a personal computing device executing a gaming application, a game console, a game server, the handheld controller itself, or the like. While current handheld controllers provide a range of functionality, further technical improvements may enhance user experiences that these controllers offer.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

DETAILED DESCRIPTION

Figure 1:
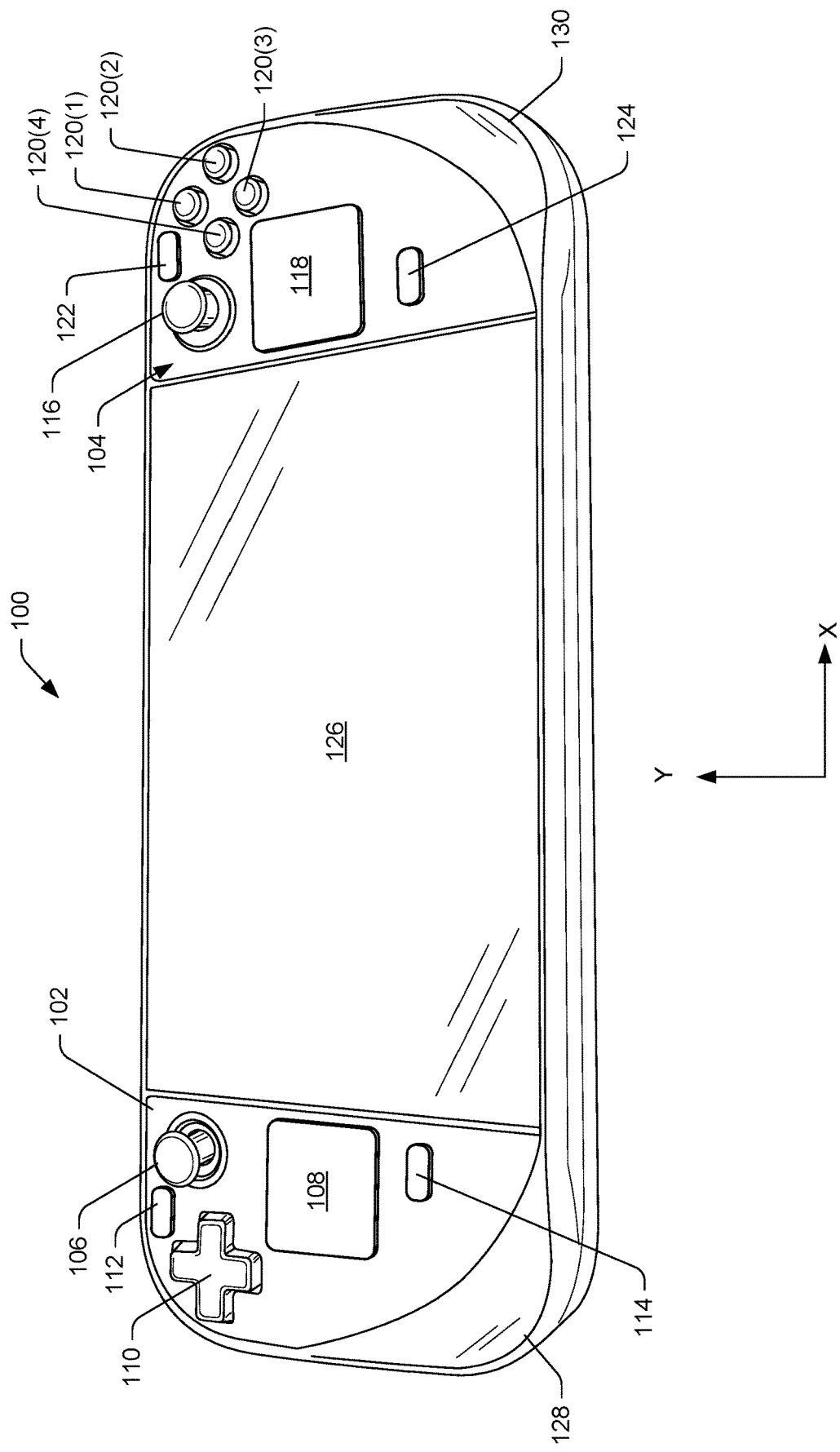
FIG. 1 illustrates a front perspective view of an example handheld controller that includes, in part, one or more front-surface controls. An individual front-surface control may include one or more sensors, such as a touch sensor for detecting at least a presence of a finger, and/or a pressure sensor for detecting an amount of force associated with a press of the finger on the control.

As mentioned above, handheld controllers are used in a range of environments and include a range of functionality. However, some traditional handheld controllers include a static configuration in terms of controls operable by a user and/or controls with limited functionality.

Described herein are, among other things, handheld controllers having various controls to engage in video game play via an executing video game application, and/or to control other types of applications and/or programs. In some instances, the handheld controller may include controls for controlling a game or application running on the handheld controller itself (e.g., handheld gaming system that is substantially self-contained on the controller). In some instances, the handheld controller may include controls for controlling a remote device (e.g., a television, audio system, personal computing device, game console, etc.). The handheld controller may include one or more controls, including one or more front-surface controls on a front surface of a housing of the handheld controller. These front-surface controls may include one or more joysticks, directional pads (D-pads), trackpads, trackballs, buttons, or other controls that are controllable, for instance, by a thumb of a user operating the handheld controller. Additionally, or alternatively, the handheld controller may include one or more top-surface controls residing on a top surface of the housing of the handheld controller. These top-surface controls may be referred to as "triggers," "bumpers," or the like, and may be controllable by one or more fingers of the user, such as a middle finger, an index finger, or the like. In some instances, the handheld controller includes one or more top-surface controls that are operable by one or more fingers of a left hand and/or one or more fingers of a right hand of the user. In addition, the handheld controller may include one or more back-surface controls. In some instances, the back-surface controls may include one or more controls operable by a left hand of a user and/or a right hand of the user.

In some instances, the handheld controller may include one or more integrated controls that have multiple functionalities. For example, the handheld controller may include a control having a touch sensor (e.g., capacitive trackpad), and/or a pressure sensor for determining an amount of force associated with the press of the control. By way of example, the handheld controller may include a trackpad having capacitive sensors (or other sensing array) for determining a presence, location, and/or gesture of a finger of a user operating the handheld controller. Furthermore, in some instances, a pressure sensor may be disposed in the control to sense an amount of force associated with the press on the control. Implementing pressure sensing in the handheld controller may expand the spectrum of natural interaction beyond its current state using conventional controllers. For example, the handheld controller (or a remotely coupled device) may determine, via the pressure sensor, a force with which the user presses the control. Using a pressure sensor that exhibits a desirable response curve, the handheld controller may translate presses into a varying digitized numerical value that can be used for a video game to control a game mechanic (e.g., to crush a rock, to squeeze a balloon, the toggle through available weapons usable by a game character, etc.).

In some instances, pressure sensors may replace conventional mechanical switches in order to reduce fatigue of the user and/or to reduce accidental actuation of the controls. For example, in some instances, the pressure sensor of a control may act as a switch by detecting when an applied force exceeds a threshold. The threshold may be adjusted to a lower value in order to reduce hand fatigue during gameplay (e.g., when the user is pressing a control associated with the FSR to shoot a weapon frequently during gameplay). Conversely, the threshold may be adjusted to a higher value in order to reduce the instances of accidental control operation, which may be useful in a thrilling or exciting game where the user might react to stimuli in the video game.

An example control of a controller may include a cover, a touch sensor disposed underneath, and coupled to, the cover, a carrier disposed underneath the touch sensor and coupled to the cover, at least one biasing member coupled to the carrier and to a housing of the controller, a metal layer disposed underneath, and coupled to, the carrier, and a pressure sensor coupled to the housing and disposed underneath, and spaced a distance from the metal layer. The touch sensor is configured to output touch data indicative of a touch on the cover. The biasing member(s) is configured to apply a biasing force on the carrier in an opposite direction to that of a force of a press on the cover (i.e., normal to the cover). The pressure sensor utilizes the metal layer to detect an amount of force of a press on the cover. For example, the pressure sensor is configured to output force data indicative of an amount of force of the press on the cover based at least in part on a proximity of the metal layer relative to the pressure sensor. Because the metal layer is coupled to the carrier, which may deflect downward in response to a press on the cover of the control, the metal layer may move closer to the pressure sensor, which is detectable by the pressure sensor. In some embodiments, the force data output by the pressure sensor includes capacitance values based on a change in capacitance between the metal layer and the pressure sensor due to a press on the cover of the control. In this scenario, the pressure sensor (in conjunction with the metal layer) may be in the form of a force sensing capacitor (FSC). Furthermore, the control may be a trackpad, in some embodiments.

Accordingly, a control (e.g., a trackpad) of a controller may include, among other things, a touch sensor for sensing an object touching a cover of the control (e.g., trackpad) and/or a pressure sensor for sensing an amount of force of a press(es) on the cover of the control (e.g., trackpad). While traditional handheld controllers include controls that are selectable, combining a control that has uses a pressure sensor to, among other things, identify selection of the control, with touch-sensing functionality may increase the amount and the richness of inputs that may be provided via the control. These inputs may include gestures that further enrich the operation of the game or other applications being controlled by the handheld controller The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front view of an example controller 100 according to an embodiment of the present disclosure. The controller 100 may be considered to be handheld if it is operated by the hands of a user, whether or not the entire controller 100 is supported by or within the hands of the user. However, in accordance with various embodiments described herein, the terms "device," "handheld device," "handheld game device," "handheld console," "handheld game console," "controller," and "handheld controller" may be used interchangeably herein to describe any device like the controller 100.

The controller 100 may include a controller body 102 having a front surface 104. The controller body 102 may further include a back surface (or back), a top surface (or top edge, or top), a bottom surface (or bottom edge, or bottom), a left surface (or left edge, or left), and a right surface (or right edge, or right). Accordingly, the controller body 102 may be a cuboid. The front surface 104 and the back surface may be relatively large surfaces compared to the top, bottom, left, and right surfaces.

Figure 2:
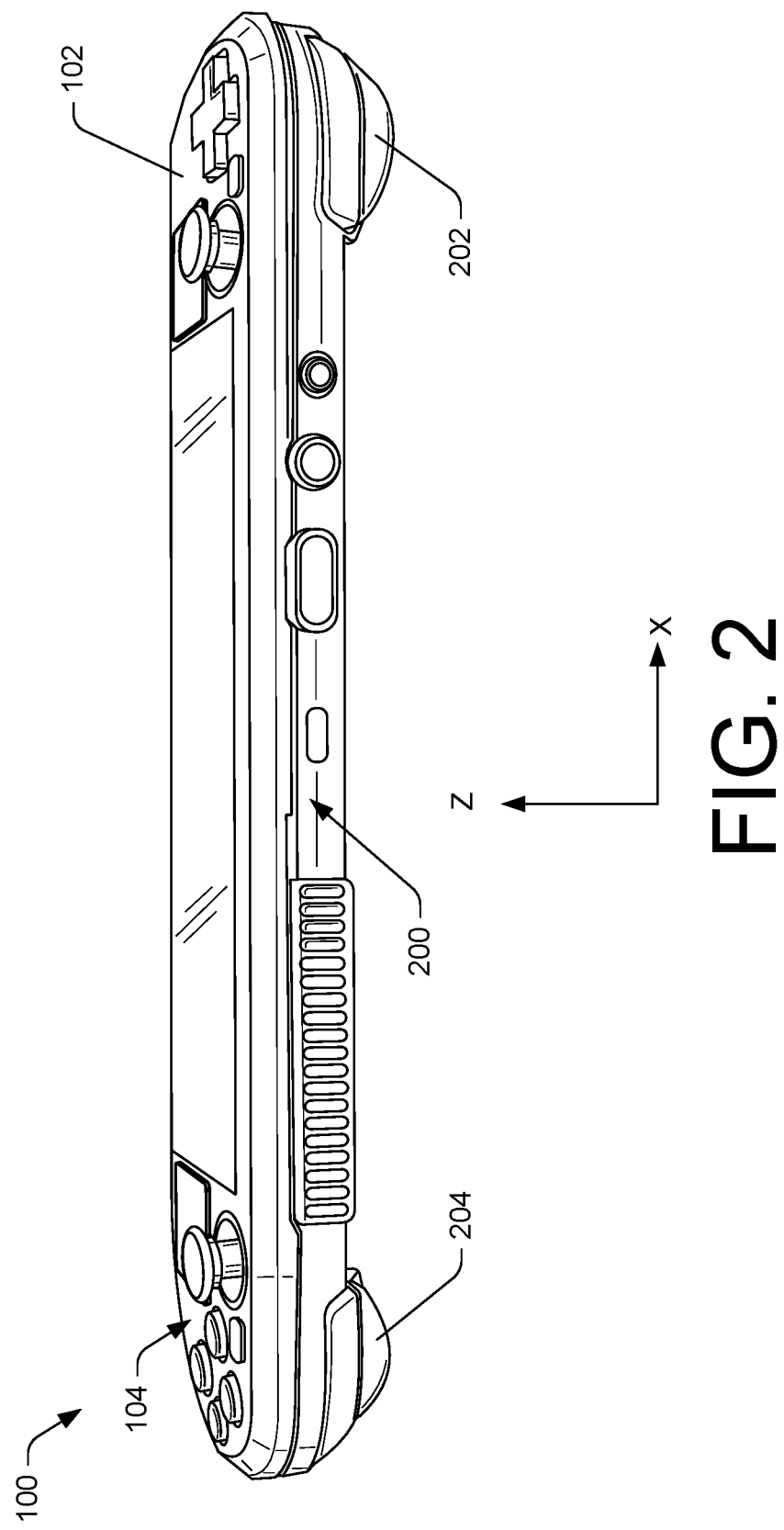
FIG. 2 illustrates a top view of the handheld controller of FIG. 1 that includes, in part, one or more top-surface controls.

As illustrated in FIG. 1, the front surface 104 of the controller body 102 may include a plurality of controls configured to receive input of the user. Touch data generated by the controls may be used to detect a presence, location, and/or gesture of a finger of a user operating the controller 100. In some instances, the front surface 104 of the controller body 102 may include one or more front-surface controls that are, in some instances, controllable by one or more thumbs of the user operating the controller 100. The handheld controller 100 may further include one or more top-surface controls residing on a top surface (or top edge) of the controller body 102, examples of which are depicted in FIG. 2. Additionally, or alternatively, the handheld controller 100 may include one or more back-surface controls residing on the back surface of the controller body 102 and operable by fingers of a left hand and/or a right hand of the user. Additionally, or alternatively, the handheld controller 100 may include one or more left-surface controls and/or right-surface controls residing on respective left and right surfaces of the controller body 102.

The front-surface controls may include one or more trackpads, trackballs, joysticks, buttons, directional pads (D-pads), or the like, as described in more detail below. For example, the front surface 104 may include a left joystick 106, a left trackpad 108, and/or a left D-pad 110 controllable by a left thumb of the user. In some embodiments, the front surface 104 may include additional left buttons controllable by the left thumb, such as the button 112 and the button 114. The front surface 104 may also include a right joystick 116, a right trackpad 118, and/or one or more right buttons 120(1)-(4) (e.g., X, Y, A, and B buttons) controllable by a right thumb of the user. In some embodiments, the front surface 104 may include additional right buttons controllable by the right thumb, such as the button 122 and the button 124. However, the front 104 may include other controls, such as tilting button(s), trigger(s), knob(s), wheel(s), and/or trackball(s), and the plurality of controls may be configured to receive input from any combination of thumbs and/or fingers of the user. In instances where the controller 100 includes trigger(s), the trigger(s) may be multi-direction triggers configured to be pushed away from the controller 100 and pulled towards the controller 100. Moreover, the controller 100 may include paddles, panels, or wings, that are configured to be pushed and/or pulled. The panels may be used to provide additional game controls to the controller 100, such as shifting in a racing game (e.g., pushing may downshift and pulling may upshift).

In some embodiments, the trackpads 108 and 118 are quadrilateral-shaped trackpads. For example, the trackpads 108 and 118 may be generally square-shaped trackpads. Furthermore, the quadrilateral-shaped trackpads 108 and 118 may have rounded corners. Additionally, as shown in FIGS. 1 and 2, a straight side edge of each trackpad 108 and 118 is aligned with (e.g., parallel to) the side (e.g., left and right) edges of a display 126 in a center of the controller body 102 on the front surface 104 of the controller body 102. As compared to circular trackpads, the quadrilateral-shaped trackpads 108 and 118 provide extra space at the corners that can be accessed by a finger (e.g., a thumb) of a user. Accordingly, the quadrilateral-shaped trackpads 108 and 118 may be more ergonomic than circular trackpads due to the extra area provided by the trackpads 108 and 118. For example, the quadrilateral shape of the trackpads 108 and 118 may give a user the ability to reorient his/her hands on the controller 100 and still access the trackpads 108 and 118 with his/her thumbs. Additionally, or alternatively, a user may choose to grip the controller body 102 in a slightly different way so that the corners of a trackpad (e.g., the trackpad 108 and 118) are used like the North, South, East, and West parts of the trackpad (e.g., like a diamond-shaped trackpad).

The controller body 102 may further includes a left handle 128 and a right handle 130 by which the user may hold the controller 100 via right and left hands of the user, respectively. Holding the left handle 128 in the left hand may provide access to the left joystick 106, the left trackpad 108, and/or the left D-pad 110. Holding the right handle 130 in the right hand may provide access to the right joystick 116, the right trackpad 118, and/or the one or more right buttons 120(1)-(4).

FIG. 2 illustrates a top view of the controller 100, showing a top surface 200 (or top 200) of the controller body 102. The top 200 may include one or more left trigger(s) 202 and/or one or more right triggers 204. In some instances, each of the one or more left trigger(s) 202 and/or the one or more right trigger(s) 204 may be located along the top 200 of the controller body 102. The one or more left trigger(s) 202 and/or one or more right trigger(s) 204 may be controlled by index fingers of the user during normal operation while the controller 100 is held by the user. The top 200 may additionally, or alternatively, include buttons (or other additional input controls controllable by fingers of the user). In some instances, the top 200 may include a touch sensor for detecting the presence, position, and/or gesture of the finger(s) on the control(s). Additionally, or alternatively, the top 200 may include receiver(s), such as a wired communication interface (e.g., a port, plug, jack, etc.), for communicatively coupling the controller 100 to external devices (e.g., charger, game console, display, computing device, etc.).

The handheld controllers described herein allow for different arrangements or functionalities to modify the configuration of the controller to meet the needs of different applications (e.g., game titles), users, and the like. For example, a first gaming application may be best played, and/or a user may prefer to play the first gaming application, with use of a first control, such as a trackpad, while a second gaming application may be best played, and/or a user may prefer to play the second gaming application, with use of a second control, such as a D-pad. Here, a user may select which controls to use depending on the gaming application currently executing. Thus, the user may configure the handheld controller with the first control and/or the second control depending on certain needs and/or preferences. In some instances, the handheld controller may be dynamically configured depending on which user is currently operating the handheld controller. Furthermore, in some instances, the handheld controller or a remote system may determine the configuration of the handheld controller and which controls are currently being operated, or capable of being operated. This information may be provided to a system executing the current application, which in turn, may make modifications based on the configuration of the handheld controller. Thus, the techniques described herein enable a dynamically configurable handheld controller that remedies some of the current deficiencies of traditional handheld controllers, as discussed above.

Figure 3A:
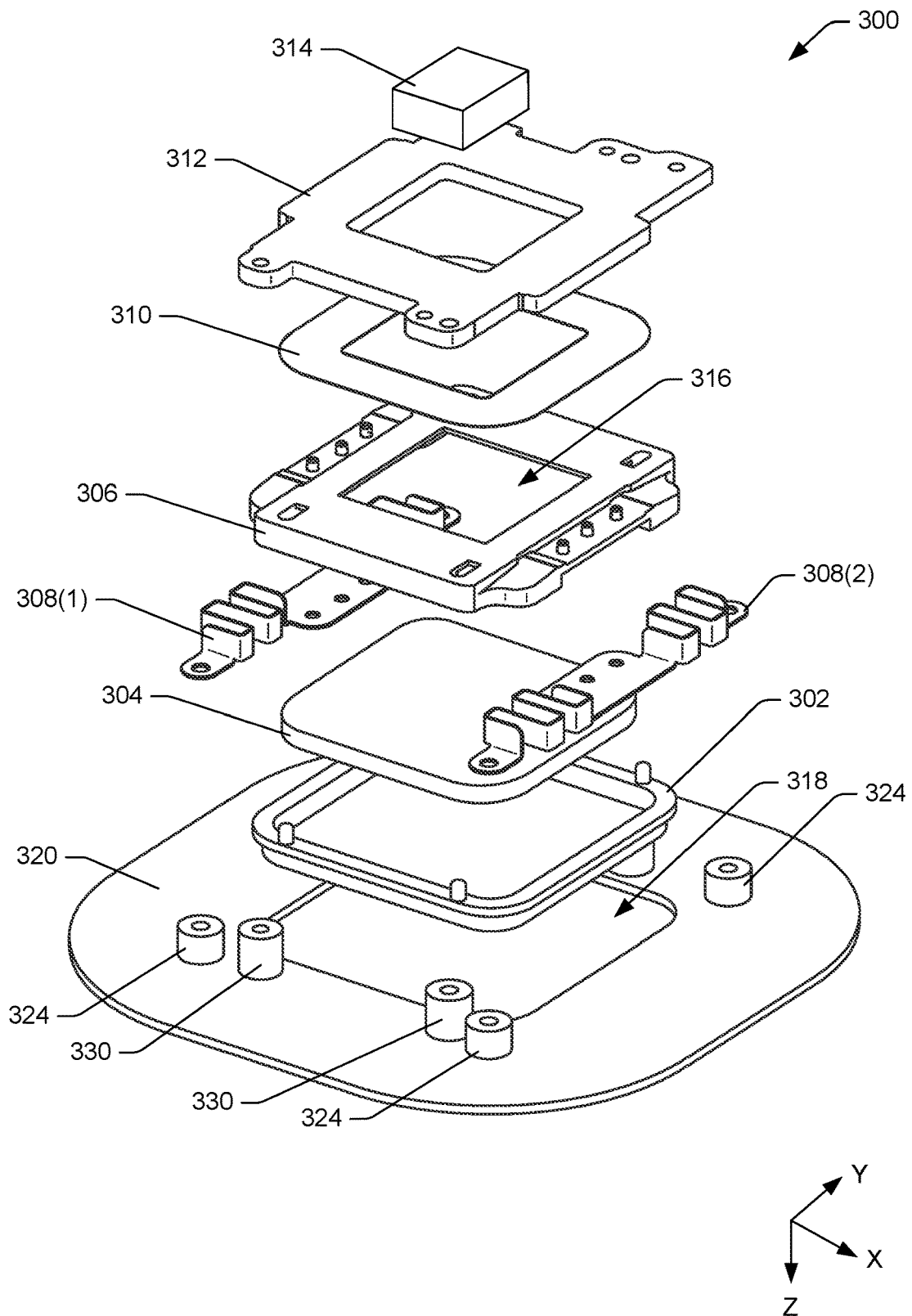
FIG. 3A illustrates a perspective exploded view of an example control in the form of a trackpad that includes, in part, a touch sensor for sensing touch input and a pressure sensor for sensing an amount of force associated with a press. In some instances, the amount of force may be sensed as a change in capacitance between the pressure sensor and a metal layer of the control.
Figure 3B:
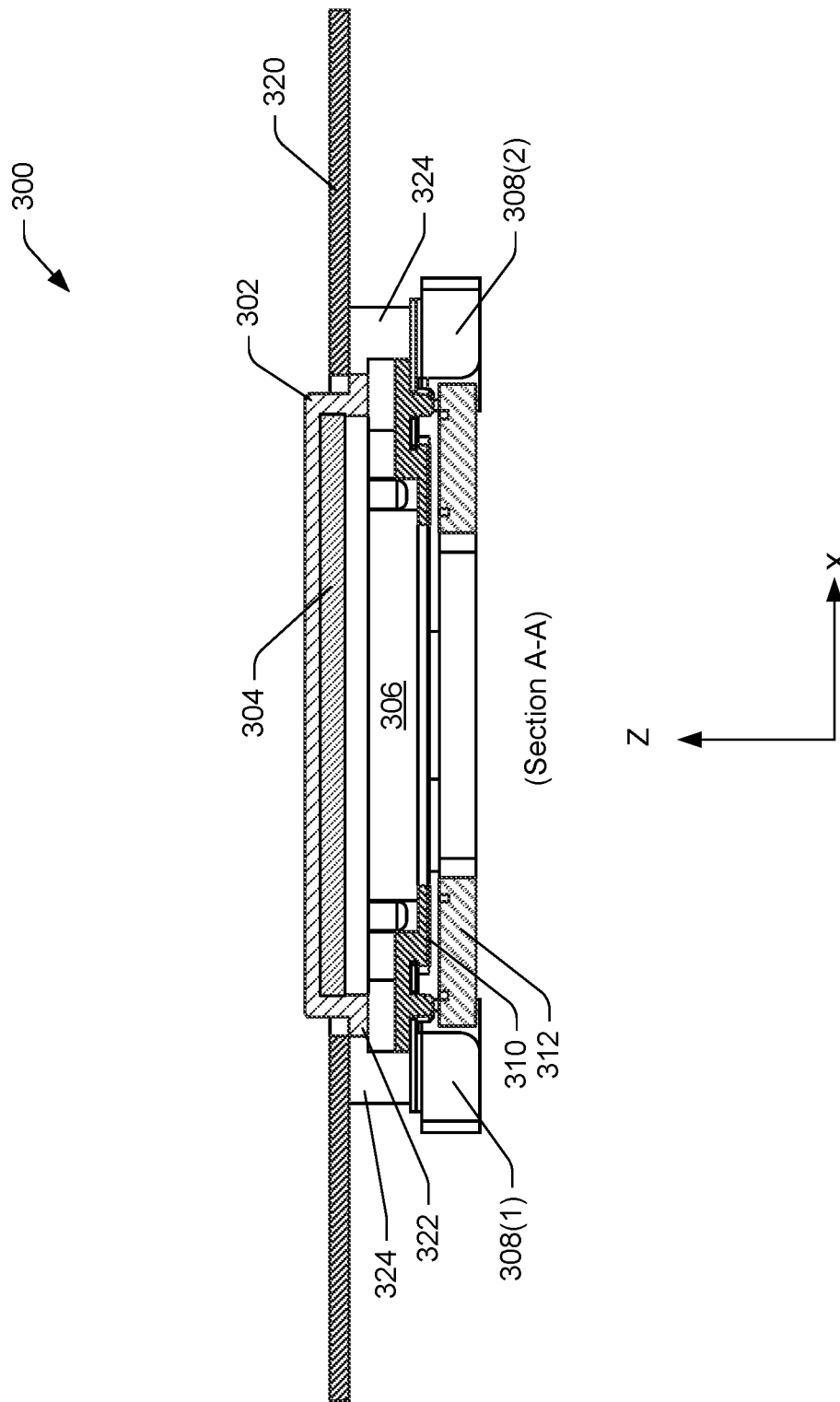
FIG. 3B illustrates a cross-sectional assembled view of the example control of FIG. 3A.
Figure 3C:
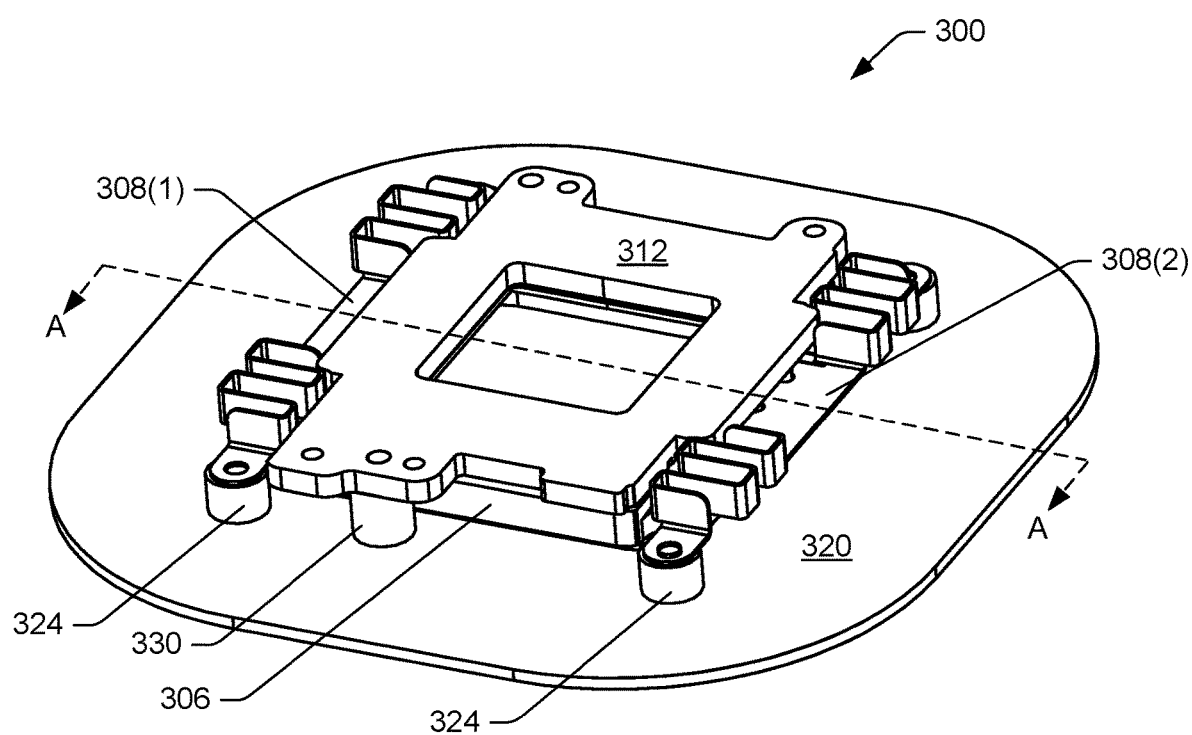
FIG. 3C illustrates a perspective assembled view of the example control of FIG. 3A from an underside of the control.

FIGS. 3A-3C illustrate an example control 300 for sensing touch at the control 300 and an amount of force associated with touches, or presses, at the control 300. In some instances, the control 300 may include a stack or layers of components stacked in a stacking direction (e.g., the Z-direction). The stack may include at least one sensor, for sensing presses and an amount of force associated with the presses. In some embodiments, the control 300 includes multiple sensors, such as a touch sensor and a pressure sensor. The sensor(s) of the control 300 may individually, or in combination, detect a presence, location, force, and/or gesture of a finger of a user. In some instances, the control 300 may resemble, represent, and/or be used for, the trackpads disclosed herein (e.g., the quadrilateral-shaped trackpads 108 and 118 of the controller 100). Accordingly, the control 300 may be a trackpad, in some examples.

FIG. 3A illustrates a perspective exploded view of the example control 300. The control 300 includes a cover 302 (sometimes referred to herein as a "top cover 302" or "cap 302"), a touch sensor 304 (e.g., a capacitive array), a carrier 306, at least one biasing member 308, a metal layer (e.g., copper foil) 310, and/or a pressure sensor 312. In some embodiments, the control 300 may further include a haptic actuator 314.

It is to be appreciated that the stacking direction of the control 300 shown in FIG. 3A is inverted in the sense that the cover 302 is generally the topmost component of the control 300 when the control 300 is implemented on the front surface 104 of a controller 100, and when the controller 100 is resting on a flat surface with the front surface 104 pointing upward. This is why the positive Z-direction is pointing downward in FIG. 3A. Based on this orientation (i.e., the positive Z-direction pointing downward in FIG. 3A), the cover 302 may be disposed on (or above) the touch sensor 304, the touch sensor 304 may be disposed on (or above) the carrier 306, the carrier 306 may be disposed on (or above) the metal layer 310, and the metal layer 310 may be disposed on (or above) the pressure sensor 312. Said another way, the pressure sensor 312 may be disposed underneath the metal layer 310, the metal layer 310 may be disposed underneath the carrier 306, the carrier 306 may be disposed underneath the touch sensor 304, and the touch sensor 304 may be disposed underneath the cover 302.

The haptic actuator 314 may be disposed underneath the touch sensor 304. Said another way, the touch sensor 304 may be disposed on (or above) the haptic actuator 314. In such implementations, the carrier 306 may include a cutout 316 and/or a recessed area that provides space where the haptic actuator 314 may be disposed within the assembled control 300.

The cover 302, as its name implies, may cover the components of the control 300 that are disposed underneath the cover 302. Accordingly, because the cover 302 is an externally-facing component of the control 300, the remaining components of the control 300, such as the touch sensor 304, the carrier 306, the biasing member(s) 308, the metal layer 310, the pressure sensor 312, and/or the haptic actuator 314 may be concealed by the cover 302. In some examples, the control 300, and, hence, the cover 302, may be disposed within an opening 318 defined in a housing 320 of a controller 100. The housing 320 depicted in FIGS. 3A-3C may represent a portion of the controller body 102 that houses the internal components of the controller 100. For instance, the cover 302 may represent the visible part of each of the trackpads 108 and 118 depicted in FIG. 1. In general, the cover 302 is configured to be touched and pressed upon in order to operate the control 300. For example, a user may touch the cover 302 with a finger and/or drag the finger across the cover 302 to move a cursor on the display 126, or to control some other aspect of an executing application. Additionally, or alternatively, a user may operate the control 300 by pressing on the cover 302 (e.g., exerting a force on the cover 302 in the negative Z-direction). If an amount of a force of a press on the cover 302 satisfies (e.g., strictly exceeds, meets or exceeds, etc.) a threshold, a processor(s) of the controller system disclosed herein may register an input event indicative of the user having "clicked" the control 300. Thus, if an amount of force of a press does not satisfy (e.g., remains below) such a threshold, an input event is not registered. However, as soon as the amount of force satisfies the threshold, an input event may be registered to control an aspect of an executing application (e.g., a video game) based at least in part on a registered press of the control 300. The threshold may be configurable such that the threshold can be adjusted to a level that provides optimal sensitivity so that it is not too difficult for a user to provide a press input on the control 300, and/or so that the control 300 does not register spurious press inputs that were not intended by the user.

In FIG. 3B, the cover 302 is shown as being coupled to the carrier 306. For example, projections extending from a backside of the cover 302 may be received within corresponding openings in a frontside of the carrier 306 (e.g., a press fit, snap fit, etc.). Additionally, or alternatively, an adhesive may be used to couple the cover 302 to the carrier 306. Due to this coupling, the act of pressing upon the cover 302 may cause the carrier 306 to deflect or otherwise move towards the pressure sensor 312 (e.g., in the negative Z-direction), because a deflection of the cover 302 is transferred to the carrier 306 due to the coupling of the cover 302 to the carrier 306. In some examples, the housing 320 may represent a surface of the controller body 120, such as a front surface 104 of the controller body 102. In an example, an opening 318 may be defined in the housing 320, and the cover 302 may include a lip 322 that is positioned underneath, or at least partially underneath, an edge of the opening 318 defined in the housing 320 so that the cover 302 does not fall out of the controller body 120 during use of the controller 300. In some instances, the top surface of the cover 302 is raised slightly above the surface of the housing 320 that surrounds the cover 302. In other cases, the top surface of the cover 302 may be coplanar with, or recessed slightly beneath, the surface of the housing 320 that surrounds the cover 302. The cover 302 may be made of a plastic (e.g., acrylonitrile butadiene styrene (ABS) plastic), or any other suitable polymer material that is relatively smooth and comfortable to touch, and also rigid enough to transfer force from a finger of the user to the carrier 306 disposed underneath, and coupled to, the cover 302. In some examples, the cover 302 is a single piece of injection-molded plastic. Furthermore, the cover 302 may be any suitable size, such as about 25 millimeters (mm) wide, about 25 mm long, and about 1 mm to 3 mm thick (where thickness is measured in the Z-direction). A thicker cover 302 increases the distance between a fingertip and the touch sensor 304, which has the effect of diffusing the electric field formed therebetween. However, a reduction in touch contact capacitance can be compensated for by increasing the size of the touch sensor 304, among other things.

The touch sensor 304 may be coupled to the cover 302 (e.g., with adhesive). For example, the touch sensor 304 may be coupled to the rear surface (or underside, backside, etc.) of the cover 302. This coupling may retain the touch sensor 304 in a fixed position relative to the cover 302, and it may keep the touch sensor 304 positioned as close to the top surface (or front surface) of the cover 302 as possible. The touch sensor 304 may be used to determine a contact, presence, location, and/or gesture of a finger operating the control 300. In some examples, the touch sensor 304 may include a capacitive sensitive array for detecting touch input at the control 300, or on the surface of the cover 302. In some instances, the touch sensor 304 includes an array of capacitive pads that spans some or substantially all of a surface area of the cover 302. In some examples, the touch sensor 304 may be used to detect when a finger has touched and dragged a predetermined distance across the cover 302 and/or the presence of a finger hovering above, but not contacting, the cover 302. Thus, the touch sensor 1704 may be configured to detect a presence and a location of the touch input on, and/or near (e.g., in proximity to), the cover 302. In implementations that utilize capacitive-based sensing, the touch sensor 304 may include electrodes (e.g., a transmitter electrode and a receiver electrode of a transcapacitive-type sensor), and voltage can be applied to the electrodes so that the electrodes are configured to measure capacitance changes at the electrodes, which can be translated into sensor data in the form of capacitance values that are indicative of proximity of an object to the sensor(s) 304. For example, capacitance changes at the electrodes of a capacitive-based touch sensor 304 may be influenced by an object (such as the finger) that is in proximity to the electrodes. In some examples, a voltage is applied to a conductive layer to result in a substantially uniform electrostatic field. When a conductor, such as a finger of a user, touches the cover 302, and/or moves near (e.g., within a threshold distance from) the touch sensor 304, a change in capacitance occurs. The capacitance values are measured across the capacitive array of the touch sensor 304 to determine the presence and/or the location of the conductor, such as the finger. In some instances, these capacitive values may be measured over time for use in identifying a gesture of the finger of the user, such as a swipe or the like. Although discussed herein as a capacitive sensing array, the touch sensor 304 may include, without limitation, a resistive touch sensor, an infrared touch sensor, a touch sensor that utilizes acoustic soundwaves to detect a presence or location of an object. The touch sensor 304 may provide touch data via a first connector (not shown) of the touch sensor 304 to one or more processors of the controller system disclosed herein, the touch data generated based on detected or sensed contact or presence of the finger on or near the cover 302.

The carrier 306 may be coupled to the cover 302, and may be configured to deflect or otherwise move (e.g., in the Z-direction) in response to an object (e.g., a finger) pressing on, or releasing pressure from, the cover 302. For example, the carrier 306 may be configured to deflect or move towards the pressure sensor 312 (e.g., in the negative Z-direction) in response to an object (e.g., a finger) pressing on the cover 302. As shown in FIG. 3A, the carrier 306 may have a quadrilateral shape (e.g., a square shape) with a cutout 316 in the center. The carrier 306 may be made of metal (e.g., sheet metal, bent steel spring, etc.). Alternatively, the carrier 306 may be made of a plastic or any other suitably-rigid polymer.

FIGS. 3A-3C depict a pair of biasing members 308(1) and 308(2), but a single biasing member 308, or more than two biasing members 308, may be implemented in some embodiments. An individual biasing member 308 is coupled to the carrier 306 and to the housing 320. For example, ends of the biasing member 308 may be mounted to projections extending from the rear surface of the housing 320, and a center portion of the biasing member 308 may include one or more holes that are configured to receive corresponding projections extending from a rear side of the carrier 306. In this manner, the biasing member 308 is anchored to the housing 320, and the biasing member 308 biases the carrier 306 in the upward (positive Z-direction) towards the housing 320. Because the cover 302 is coupled to the carrier 306, this biasing force physically biases a portion of the cover 302 (e.g., the lip 322 of the cover 302) against an inner surface of the housing 320. The biasing member 308 may be a compliant element that is configured to deflect and/or deform in response to an object (e.g., a finger) pressing on the cover 302, and to return to an original form and/or position when the pressure on the cover 302 ceases (e.g., when the finger is removed from, or stops applying pressure upon, the cover 302). In some implementations, the biasing member 308 is a spring made of metal (e.g., spring steel). FIGS. 3A and 3C illustrates the biasing members 308(1) and 308(2) as elongate members that are positioned alongside opposing sides of the carrier 306 and mounted to mounting projections 324 that extend from the inner surface of the housing 320. In some examples, the first biasing member 308(1) is a first anisotropic spring coupled to a first side of the carrier 306 (i.e., the first side being between the top and bottom surfaces of the carrier 306), and the second biasing member 308(2) is a second anisotropic spring coupled to a second side of the carrier 306 opposite the first side. In this manner, the pair of anisotropic springs 308 apply a biasing force upward (e.g., in the positive Z-direction) on the carrier 306 from opposing sides of the carrier 306 to provide a balanced, upward biasing force on the carrier 306. The elongate biasing members 308 may include a relatively straight middle portion and end portions with the material of the biasing members 308 bent in an accordion style, or zig-zag formation. This structure of the biasing members 308 provides an anisotropic characteristic to the biasing members 308 which optimizes the forces of the biasing members 308 on the carrier 306 in orthogonal directions. For example, the biasing force in the positive Z-direction is optimized for a press on the cover 302, and the biasing force in the X-direction and/or the Y-direction is optimized for the vibration of the haptic actuator 314, which causes the carrier to vibrate when haptic feedback is provided by the haptic actuator 314.

The metal layer 310 may be coupled to the carrier 306 (e.g., with adhesive), such as the bottom surface of the carrier 306. In some embodiments, the metal layer 310 is a copper foil (or tape) that is relatively thin, as compared to the other components of the control 300. The metal layer 310 may have a quadrilateral shape (e.g., a square shape) with a cutout in the center to facilitate coupling of the metal layer 310 to the bottom of a similarly-shaped of carrier 306. Deflection or movement of the carrier 306 in response to the object (e.g., a finger) pressing on the cover 302 causes the metal layer 310 to deflect or otherwise move towards the pressure sensor 312 due to the metal layer 310 being attached to the bottom surface of the carrier 306.

Figure 3D:
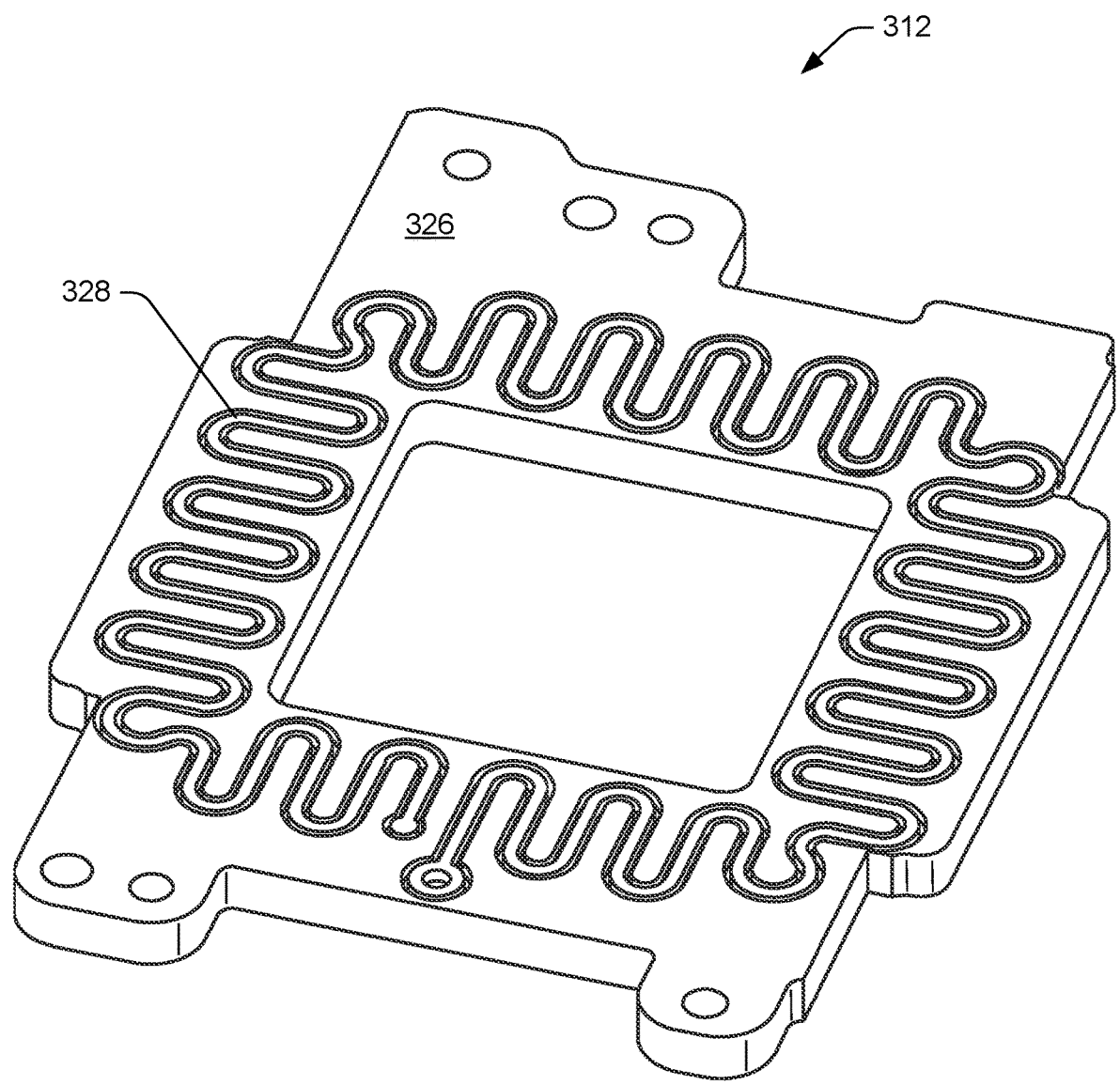
FIG. 3D illustrates a perspective view of the pressure sensor included in the example control of FIG. 3A.

The pressure sensor 312 and the metal layer 310 may represent a force sensing capacitor (FSC). For example, FIG. 3D illustrates the pressure sensor 312 as including a substrate 326 (e.g., a board) that includes an electrode 328 (or "sense electrode 328"). The pressure sensor 312 (e.g., or the substrate 326 thereof) may be coupled to the housing 320 in order to keep the pressure sensor 312 at a fixed distance from the housing 320 so that the pressure sensor 312 does not move relative to the housing 320, even when the cover 302 is pressed upon. FIG. 3C depicts the substrate 326 of the pressure sensor 312 mounted to projections 330 extending from an inner surface of the housing 320. The height of the projections 330 at least partly controls the distance that the pressure sensor 312 (e.g., or substrate 326 thereof) is spaced from the metal layer 310. In other words, the pressure sensor 312 may be spaced a distance from the metal layer 310, such as by an air gap disposed between the metal layer 310 and the pressure sensor 312. The distance that the pressure sensor 312 is spaced from the metal layer 310 in the assembled control 300 may be at least about 0.5 millimeters (mm). In some embodiments, this distance (or air gap) may be in a range of about 0.5 mm to 1 mm in the Z-direction.

Although the air gap between the pressure sensor 312 and the metal layer 310 is relatively small (e.g., about 0.5 mm), the electrode 328 of the pressure sensor 312 may be able to sense or detect relatively small displacements of the metal layer 310 within the air gap between the metal layer 310 and the pressure sensor 312. In some examples, a voltage is applied to the electrode 328 of the pressure sensor 312 to result in a substantially uniform electrostatic field. When the metal layer 310 (which is a conductor) moves towards the pressure sensor 312 in response to a press on the cover 302, a change in capacitance occurs. The capacitance values are measured by the pressure sensor 312 (e.g., using the sense electrode 328, and using the substrate 326 as a ground reference) to determine a force of a press on the cover 302. In some instances, the capacitive values may be measured over time for use in determining whether the capacitive values satisfy a threshold to register a press input event (e.g., a "click" of the control 300). Although discussed herein as a FSC, other pressure sensing technologies may be employed, such as by using a force sensing resistor (FSR), a piezoelectric pressure sensor, and the like. The pressure sensor 312 may provide force data via a second connector of the pressure sensor 312 to one or more processors of the controller system disclosed herein, the force data indicative of an amount of force of a press on the cover 302 based at least in part on a proximity of the metal layer 310 to the pressure sensor 312.

The haptic actuator 314 (shown in FIG. 3A, but not shown in FIG. 3B) may be coupled to the carrier 306, either directly or indirectly, and may be configured to provide haptic feedback (e.g., by vibrating, pulsing, etc.) in response to one or more criteria being met. An example criterion may be met if an amount of force of a press on the cover 302 satisfies a threshold. Said another way, the criterion may be met if the force data provided by the pressure sensor 312 includes one or more values (e.g., one or more capacitance values) that satisfy a threshold, the force data indicative of an amount of force of a press on the cover 302. Thus, if a user presses hard enough on the cover 302 to register a press input event, the user may feel haptic feedback in the form of a tactile, vibration of the cover 302. Another example criterion may be met if the touch data provided by the touch sensor 304 indicates that a finger has touched the cover 302 and subsequently dragged a predetermined distance across the cover 302 while touching the cover 302. In this way, a user can feel a tactile, vibration of the cover 302 whenever the user drags a finger a predetermined distance across the cover 302, which may be indicative of toggling between user interface elements on the display 126. A processor(s) of the controller system disclosed herein may be configured to process the touch data and/or the force data from the touch sensor 304 and/or the pressure sensor 312, respectively, in order to determine if one or more criteria are met, and, if so, send a control signal to the haptic actuator 314 to provide haptic feedback. The control signal may specify a frequency (e.g., a value in Hertz (Hz)) to drive the haptic actuator 314 at the specified frequency. The haptic actuator 314 may be any suitable type of haptic actuator including, without limitation, a linear resonant actuator (LRA), an eccentric rotating mass (ERM), or the like. The haptic actuator 314 may vibrate or resonate in any suitable direction, such as the X, Y, and/or Z direction depicted in FIGS. 3A-3C.

The control 300 depicted in FIGS. 3A-3C, and the pressure sensor 312 depicted in FIG. 3D may provide several benefits. For example, the pressure sensor 312 is relatively cheap and easy to manufacture, and the intelligence for sensing an amount of force of a press on the cover 302 is provided by the pressure sensor 312 with respect to a "dumb" metal layer 310 proximate to the pressure sensor 312. In this way, the pressure sensor 312 is configured to operate with any suitable type of metal layer 310 that can be manufactured without having to adhere to strict manufacturing tolerances, which makes the entire FSC (e.g., pressure sensor 312 and metal layer 310) relatively cheap to manufacture and assemble in the control 300. An alternative to this design would be to have two "intelligent" circuit boards that are spaced apart and configured to measure capacitance changes therebetween based on relative displacement of the two boards, but this would require more wiring and circuitry than the disclosed FSC (e.g., pressure sensor 312 and metal layer 310) for pressure sensing. Furthermore, the dual biasing members 308 allow for multimodal flexure where the amount of travel of the movable components (e.g., the cover 302, the touch sensor 304, the carrier 306, and the metal layer 310) is optimized in both the direction of travel due to a press on the cover 302 and the direction of travel due to haptic feedback provided by the haptic actuator 314. That is, the pair of biasing members 308(1) and 308(2) (e.g., anisotropic springs) provide an optimized press response and vibrational response, independently of each other. In an example, the anisotropic springs (308) may be relatively more compliant in the X or Y direction than in the Z direction.

Figure 4:
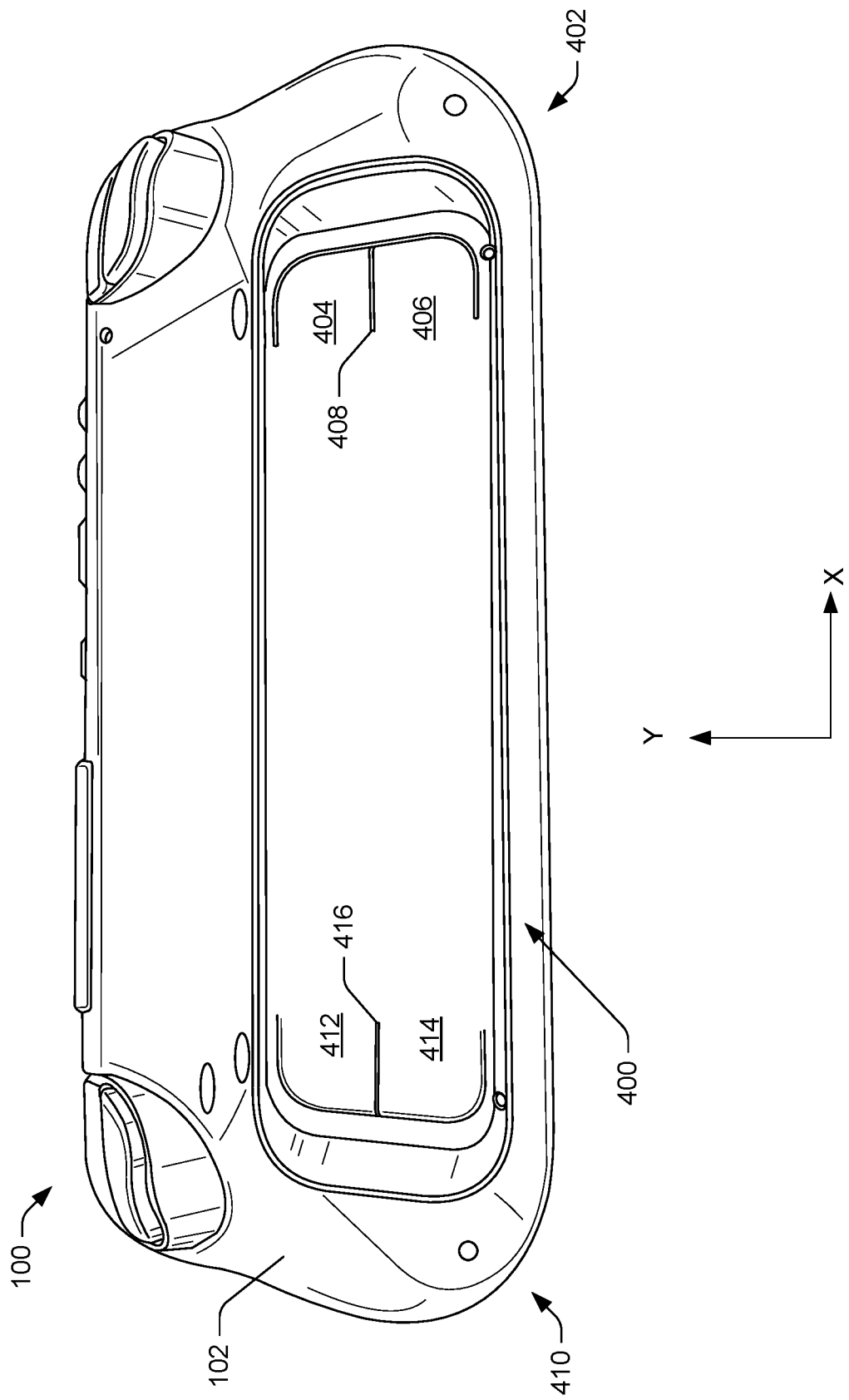
FIG. 4 illustrates a rear view of the handheld controller of FIG. 1 that includes, in part, one or more rear-surface controls.

FIG. 4 illustrates a back view of the controller 100, showing a back 400 of the controller 100. In some instances, the back 400 of the controller body 102 may include controls conveniently manipulated by the index or middle fingers of the user. In some instances, the back 400 may include portions that are depressible to control one or more underlying buttons within the controller 100. For example, a left portion 402 of the controller 100 may include a first upper control 404 and a first lower control 406. The first upper control 404 and the first lower control 406 may be separated by a first parting line 408 such that the user may selectively engage the first upper control 404 and the first lower control 406. Additionally, or alternatively, a right portion 410 of the back 400 of the controller 100 may include a second upper control 412 and a second lower control 414. The second upper control 412 and the second lower control 414 may be separated by a second parting line 416 such that the user may selectively engage the second upper control 412 and the second lower control 414. In some instances, pressure sensors (e.g., FSRs, FSCs, etc.) may respectively underlie the first upper control 404, the first lower control 406, second upper control 412, and the second lower control 414. The pressure sensors (e.g., FSRs, FSCs, etc.) may detect an amount of force associated with presses of the respective controls. Additionally, or alternatively, switches or other actuators may be disposed beneath the controls on the back 400 of the controller body 102.

Figure 5:
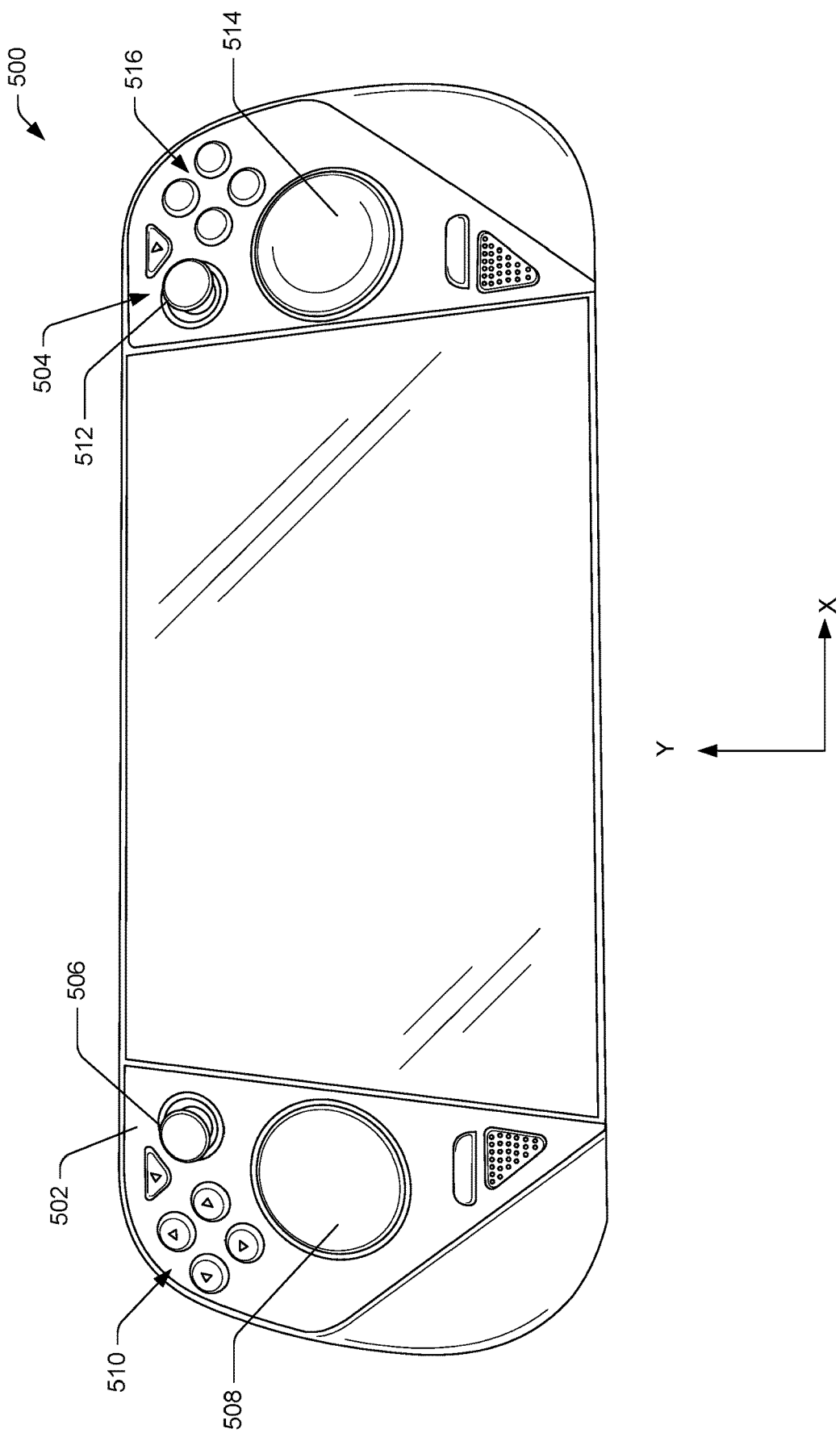
FIG. 5 illustrates a front perspective view of an example handheld controller that includes, in part, one or more front-surface controls. An individual front-surface control may include one or more sensors, such as a touch sensor for detecting at least a presence of a finger, and/or a pressure sensor for detecting an amount of force associated with a press of the finger on the control.

FIG. 5 illustrates a front view of an example controller 500 according to an embodiment of the present disclosure. In some instances, the controller 500 may include similar features, or components, as the controller 100. For example, a front 504 of a controller body 502 of the controller 500 may include a plurality of controls configured to receive input of the user. As compared to the controller 100, the controller 500 may include a left joystick 506, a left trackpad 508, and/or a left D-pad 510 (e.g., in the form of four separate buttons) controllable by a left thumb of the user. The controller 500 may also include a right joystick 512, a right trackpad 514, and/or one or more right buttons 516 controllable by a right thumb of the user. Furthermore, as shown in FIG. 5, the trackpads 508 and 514 may be circular-shaped trackpads. Touch data generated by the controls may be used to detect a presence, location, and/or gesture of a finger of a user operating the controller 500. However, the controller 500 may additionally, or alternatively, include one or more tilting button(s), trigger(s), knob(s), wheel(s), and/or trackball(s).

Figure 6:
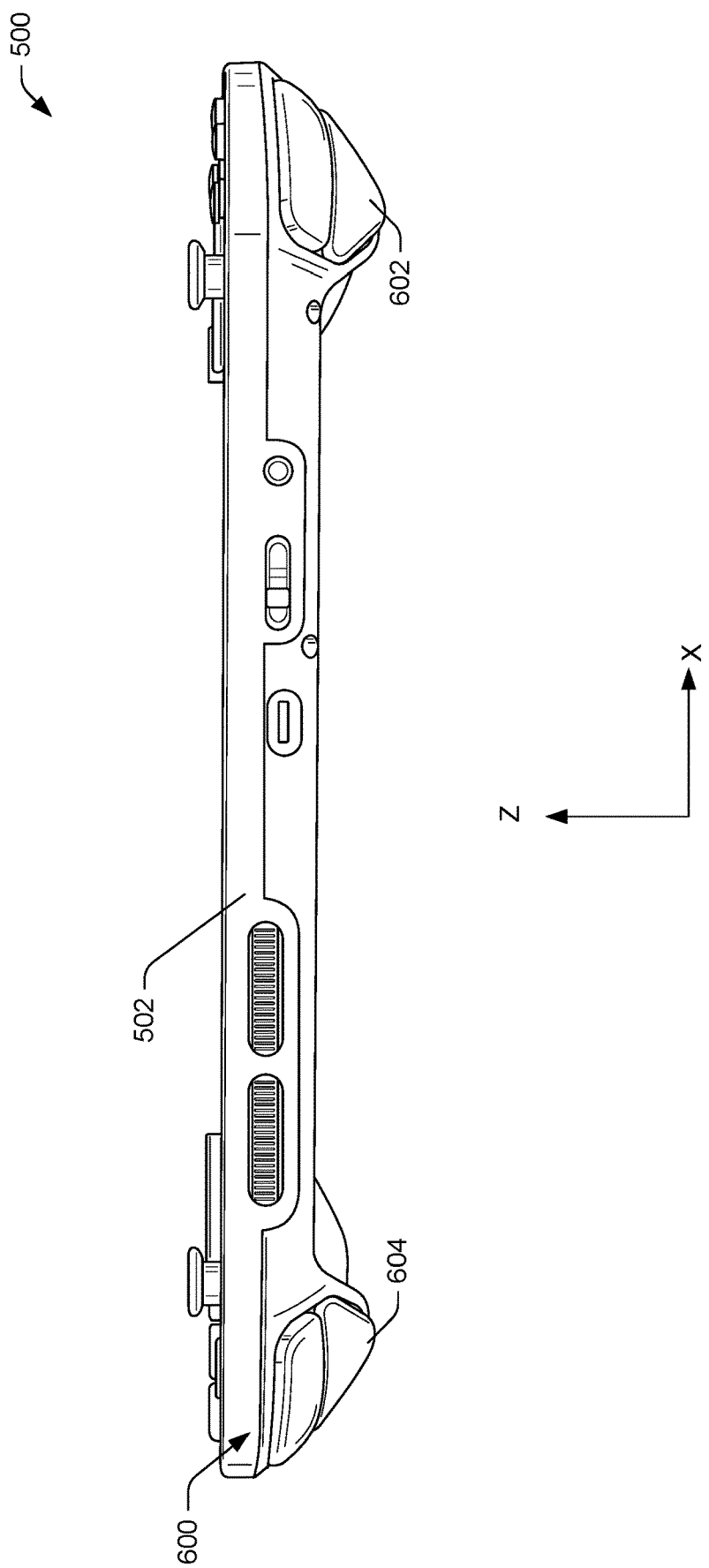
FIG. 6 illustrates a top view of the handheld controller of FIG. 5 that includes, in part, one or more top-surface controls.

FIG. 6 illustrates a top view of the controller 500, showing a top 600 of the controller body 502. The top 600 of the controller 500 may include similar features, or components, as the top 200 of the controller 100. For example, the top 600 may include one or more left trigger(s) 602, one or more right trigger(s) 604, depressible buttons, receiver(s), such as a wired communication interface (e.g., a port, plug, jack, etc.), for communicatively coupling the controller 500 to external devices (e.g., charger, game console, display, computing device, etc.), and/or touch sensor(s) for detecting the presence, position, and/or gesture of the finger(s) on the control(s).

Figure 7:
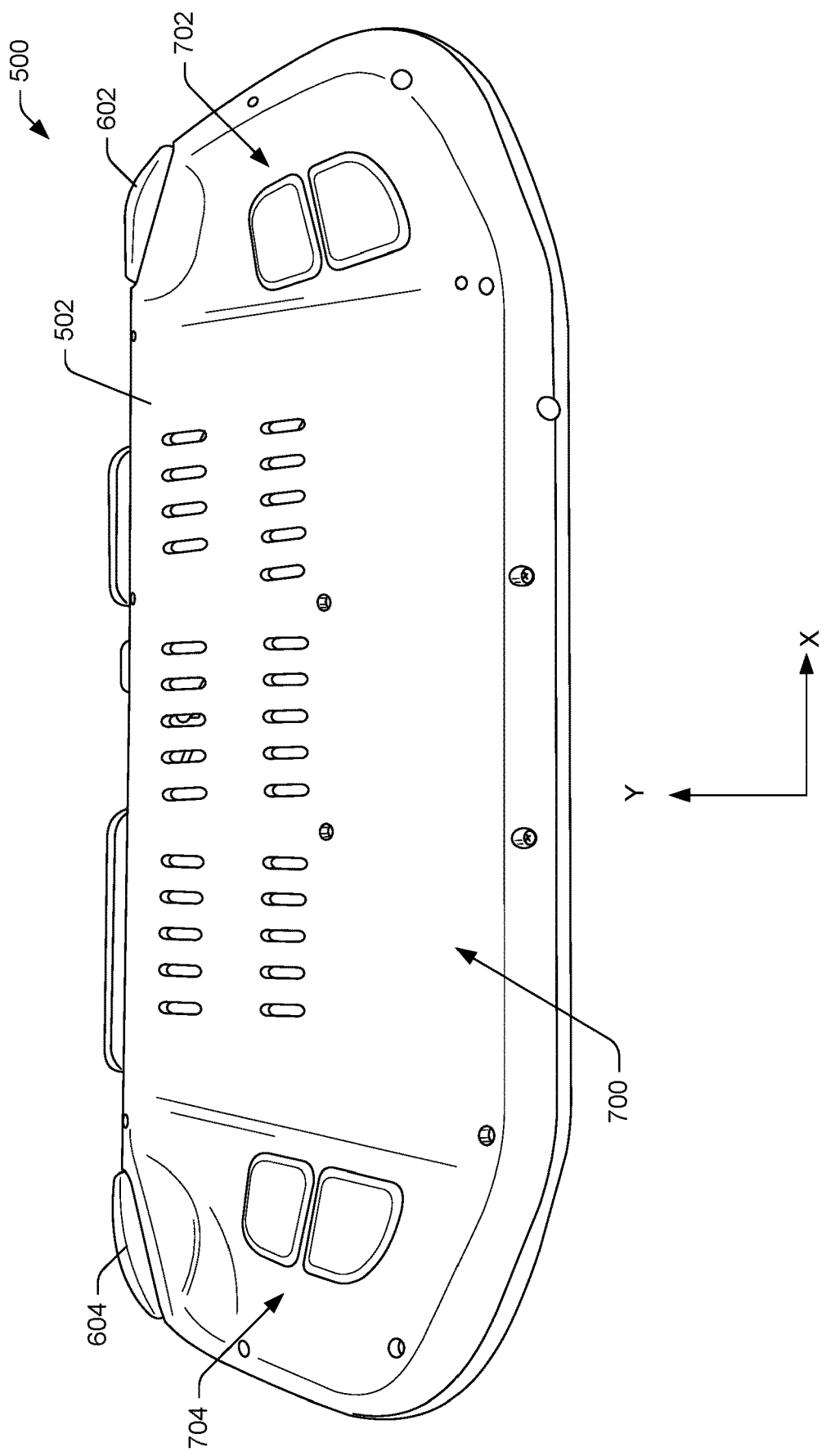
FIG. 7 illustrates a rear view of the handheld controller of FIG. 5 that includes, in part, one or more rear-surface controls.

FIG. 7 illustrates a back view of the controller 500, showing a back 700 of the controller body 502. The one or more left trigger(s) 602 and the one or more right trigger(s) 604 are also visible in the back view of FIG. 7. The back 700 of the controller body 502 may also one or more left controls 702 and/or one or more right controls 704, which may be conveniently manipulated by the index or middle fingers of the user during normal operation while the controller 500 is held in the hands of the user. The one or more left controls 702 and/or one or more right controls 704 may be touch-sensitive to identify the presence, position, and/or gestures of one or more fingers on the control(s).

Figure 8A:
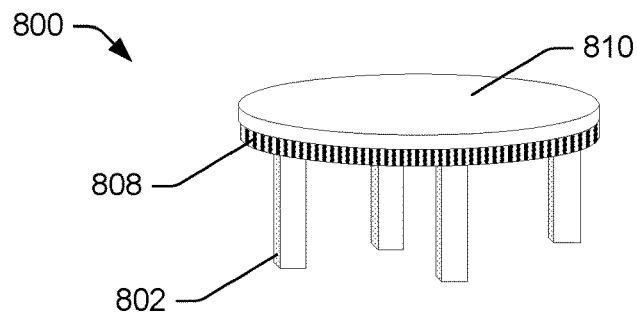
FIG. 8A illustrates a perspective view of an example front-surface control that includes, in part, a touch sensor and one or more projections for engaging with one or more actuatable switches of a handheld controller for detecting a press at the control. Pressure sensor(s) may also detect an amount of force associated with the press at the control.
Figure 8B:
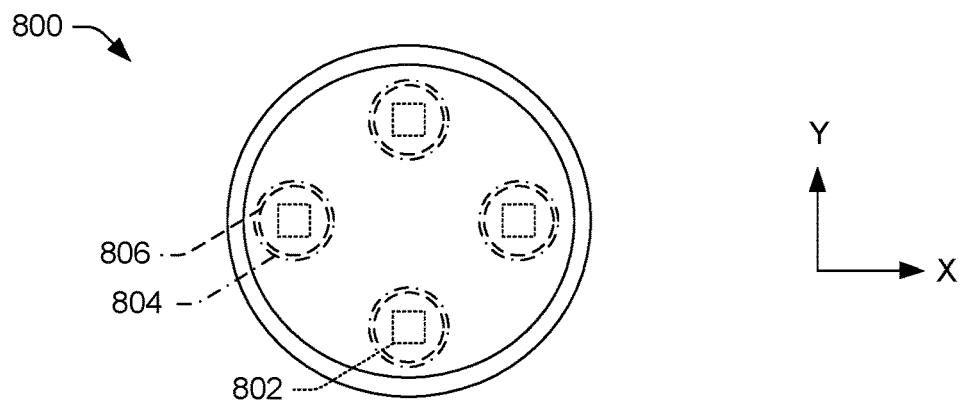
FIG. 8B illustrates a top view of the front-surface control of FIG. 8A that includes, in part, the one or more projections for engaging with one or more actuatable switches of the handheld controller for detecting a press at the control. Pressure sensor(s) may also detect an amount of force associated with the press at the control.
Figure 8C:
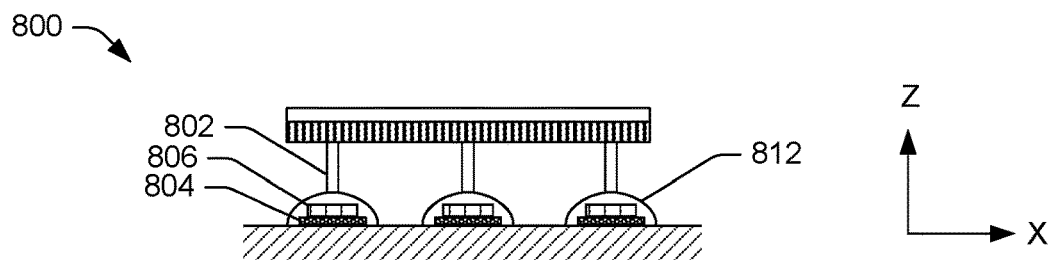
FIG. 8C illustrates a side view of the front-surface control of FIG. 8A, showing the one or more projections for engaging the one or more actuatable switches disposed within a controller body of the handheld controller, beneath example collapsible structures. Pressure sensor(s) may also detect an amount of force associated with the press at the control.

FIGS. 8A-8C illustrate various views of a control 800 having projections 802 for engaging switches 804 (e.g., tactile switches) and/or FSRs 806 of a controller (e.g., the controller 100 and/or the controller 500). In this example, the control 800 includes a touch sensor 808 adjacent to a top cover 810, the switches 804 for detecting a press of the control 800, and the FSRs 806 for determining an amount of force associated with the presses or touches received at the control 800. In some instances, the control 800 may resemble, represent, and/or be used for, the trackpads (e.g., trackpad 108, trackpad 118, trackpad 508, trackpad 514) of the controller 100 and/or the controller 500, and/or the D-pad 110 of the controller 100, or the D-pad 510 of the controller 500. In this manner, an actuatable control 800 (e.g., a trackpad) may deflect or depress to activate the switches 804 beneath the trackpad. In some instances, the switches 804 and/or the FSRs 806 may enable D-pad functionality or be arranged beneath the trackpad to resemble a D-pad. For example, the control 800, or the trackpad, may be depressed in four directions (e.g., left, right, up, and down) or at four locations. As such, the control 800 may operate as a trackpad, as well as a D-pad, for detecting a touch (e.g., presence, location, and/or gesture) and/or a press of a finger of a user operating the handheld controller. Providing the switches 804 beneath areas of the trackpad may provide improved feedback to the user when depressing the control 800 and/or may increase gameplay experiences during a use of the handheld controller.

The control 800 may include the touch sensor 808 disposed on, within, and/or underneath a surface of the control 800, or within a body of the control 800, for sensing touch on, and/or in proximity to, the top cover 810. The touch sensor 808 may include a capacitive sensitive array for detecting touch input at the control 800, or on the surface of the control 800. In some instances, the touch sensor 808 includes an array of capacitive pads that covers some or substantially all of a surface area of the control 800. In this example, the touch sensor 808 may be adhered or otherwise attached to a back surface of the top cover 810 of the control 800. Although discussed herein as a capacitive sensitive array, the touch sensor 808 or the control 800 may include a resistive touch sensor, an infrared touch sensor, a touch sensor that utilizes acoustic soundwaves to detect a presence or location of an object. The touch sensor 808 may be configured to detect a presence and a location of the touch input on, and/or near (e.g., in proximity to), the control 800. In these instances, a voltage is applied to a conductive layer to result in a substantially uniform electrostatic field. When a conductor, such as a finger of a user, touches the top cover 810 or moves near (e.g., within a threshold distance from) the touch sensor 808, a change in capacitance occurs. The capacitance values are measured across the capacitive array to determine the presence and/or the location of the conductor, such as the finger. In some instances, these capacitive values may be measured over time for use in identifying a gesture of the finger of the user, such as a swipe or the like.

In addition to the touch sensor 808, the control 800 may include the projections 802 for contacting or engaging the switches 804 and/or the FSRs 806 within the controller. In some instances, the switches 804 and/or the FSRs 806 may be disposed within a controller body of the controller. This way, the controller includes the switches 804 that are selectable via a press of the control 800, depending on where the user presses on the top cover 810, as well as the FSRs 806 that detect or measure an amount of force associated with the press. The top cover 810 may include a single piece of injection-molded plastic or any other material that is rigid enough to transfer a force from a finger of the user to the switches 804 and the FSRs 806 and thin enough to allow for capacitive coupling between a finger of the user and the touch sensor 808.

As illustrated, the projections 802 may extend from a bottom surface of the touch sensor 808 for engaging the switches 804 and/or the FSRs 806. In some instances, the touch sensor 808 may be molded around the projections 802 and/or the control may include additional layers vertically above and/or vertically beneath the touch sensor 808 for supporting the projections 802. Therefore, in some instances, when a finger of a user presses the top cover 810, the control 800 presses down on an associated switch 804 as well as an associated FSR 806.

The switches 804 and the FSRs 806 may each couple (e.g., via a connector, transceiver, etc.) to the one or more processors (e.g., PCBs) of the controller system (e.g., a processor(s) within the controller body, processor(s) of a separate computing device, etc.) such that press of the control 800 may result in selection data, indicative of a press of the control 800, being provided from the switch 804 to the processors. The FSRs 806 may provide force data, indicative of an amount of force of the press, to the processors. Along with the touch data, the selection data and/or force data may be provided to a game or other application for interpreting the data as one or more commands within a game or application. In some instances, the touch data, the selection data, and/or the force data may be interpreted together and associated with a predefined command. In some instances, a remote system (e.g., a host computing device, a game console, etc.) that the controller is interacting with may determine the presence and/or location of the touch, and/or the amount of force associated with the touch (or press).

In some instances, data as generated by the touch sensor 808 and data as generated by the switches 804 may be combined to determine the presence of a touch at the control 800. For example, touch data generated by the touch sensor 808 may be used in combination with selection data generated by the switches 804 (or a switch that is depressed) to confirm the presence of a touch at the control 800 and/or the location of the touch on the control 800. The touch data generated by the touch sensor 808 may indicate that the user touched the top cover 810 on the right-hand side (e.g., right direction on the D-pad). If the switch 804 also underlying the touch sensor 808 on the right-hand side also detected input, the presence and/or location of the touch on the top cover 810 at this location may be confirmed or determined. Such determination may be used to control a game or application operated by the control 800. For example, the processors of the controller or a remote device may compare the generated by the sensors, switches, FSRs of the controller for determining commands.

In some instances, after the touch data generated by the touch sensor 808 and the selection data generated by the switch 804 are used to confirm the presence of a touch, for example, only one of the touch data or the selection data may be used for performing an action. In some instances, the controller or the remote device may include logic to implement sensor fusion algorithms based on force data provided by a FSR of the controller in combination with touch data provided by a touch sensor and selection data generated by the switches. Furthermore, in instances where one of the switches detects a touch but the touch sensor does not detect the presence of a touch, the detected selection by the switch may be ignored.

Accordingly, data received from the touch sensor 808, the switches 804, and/or the FSRs 806 may be used for determining gestures of the user at the control and/or an intent of the user. As illustrated, the control 800 may include four projections for functioning as a D-pad. The control 800 may include the touch sensor 808 to detect touch, and may be depressible to engage the switches 804 and/or the FSRs 806 disposed within the controller. In some instances, the control 800 may be configured to move in four directions (e.g., the four cardinal directions). However, in some instances, other trackpads having any other range of movement may be used. For example, the control 800 may be moveable in eight directions (e.g., the four cardinal directions and the four intercardinal directions) to function as an eight-way D-pad.

The control 800 may be moved or flexed from a resting position by the force of a press of a user, but returning to a rest position when not under load. For example, resilient domes 812 may be disposed over the switches 804 and/or the FSRs 806. The resilient domes 812 may represent spring-like structures that collapse and expand to provide mechanical feedback to the user of the control 800 (e.g., click) and/or which dispose the control 800 to the resting position. The resilient nature of the control 800, or the resilient domes 812, may enable for the user to selectively depress the switches 804 in response to forces or pressures selectively applied by the user. In some instances, the resilient domes 812 may include an electrically conductive material (e.g. stainless steel) and form one pole of a binary switch (e.g. a momentary contact switch), which may selectively be brought into contact with the FSRs 806. In that case, the binary presence or absence of contact between the resilient dome 812 and the FSR 806 may serve as an electrical switch mechanism that changes state (from electrically conductive to non-conductive, or vice versa) in a binary manner, while the FSRs 806 are able to sense the magnitude of the collapsing force in an analogue manner after contact is made with the resilient domes 812.

In some instances, the switches 804 may include tact switches, mechanical switches that are depressible, lever arms, or other buttons that detect that a press (or selection) of the control or at the control. Additionally, although the control 800 (or the controller) is discussed as having the FSRs 806 for detecting force, the control 800 may include other sensors, piezoelectric sensors, load cells, strain gauges, capacitive-type pressure sensors that measure capacitive force measurements, or any other type of pressure sensor. In instances in which the user applies a press, or touch, that is received across multiple switches and/or FSRs, their values may be combined for determining an associated press. This press may also be associated with an amount of force.

Additionally, although illustrated as generally flat, or planar, the control 800 may be concave and/or convex. Such features increase user comfort and/or feel when operating the control 800. For example, the top cover 810 may be concave or flex for user comfort. In such instances, the touch sensor 808 may follow a contour of the top cover 810 for sensing touch input.

As shown in FIG. 8C, the switches 804 may be disposed vertically below the FSRs 806. However, in some instances, the switches 804 may be above the FSRs 806 and/or the FSRs 806 may be integrated within, or coupled to, the top cover 810. In some instances, the FSRs 806 may be adhered to the underneath sides of the touch sensor 808. In some instances, by mounting the FSRs 806 adjacent to the touch sensor 808 and/or the top cover 810, the FSRs 806 may measure a resistance value that corresponds to an amount of force applied to an associated portion of the control 800 (e.g., a force applied to an outer surface of the top cover 810).

In some instances, the handheld controller may include a lockout feature for disabling one or more features of the control. For example, in instances where the control operates as a trackpad and a D-pad, a lockout feature may disable the D-pad functionality and prevent the control and/or the D-pad from being depressed. Thereafter, the control may function as a trackpad but may not be actuatable as a D-pad. The lockout feature may be moveable to enable and disable features or functionality of the control. For example, if the user does not wish to operate the control as a D-pad, the user may insert the lockout feature or otherwise utilize or activate the lockout for preventing the control from depressing and functioning as a D-pad. However, despite the lockout, the control may still be functional as a trackpad for receiving touch input.

In some instances, the lockout feature may be mechanically moved by the user (e.g., an insert that prevents the control from moving, etc.) or may be controlled by the handheld controller system. For example, depending on the game or application being controlled by the handheld controller, the lockout feature may be automatically enabled or disabled to permit certain functionalities of the control. Additionally, or alternatively, the handheld controller may include arms, levers, or braces beneath the control that when moved into place or activated, prevent the control from depressing. In some instances, the user may activate the lockout feature on the handheld controller via a button or slide pressed or controlled by the user. For example, the user may slide a knob that positions braces beneath the control and prevents the control from depressing.

By way of example, the lockout feature may slide between the control 800 and the controller to prevent the control 800 being depressible. Additionally, or alternatively, the controller may include an actuatable slide that is capable of being inserted within the control 800 (e.g., between the control 800 and the controller) and which prevents the control 800 being depressible. In another example, mechanical features may be inserted within an opening of the controller in which the control 800 resides to prevent the control 800 being depressible. Regardless of how the lockout feature is implemented, the lockout feature may represent a mechanical structure that prevents the control 800 being depressible. However, in instances where the lockout feature is implemented, the touch sensor 808 of the control may continue to receive touch input for determining the presence of a touch, a location of the touch, and/or a gesture. Disabling the depressible features of the control 800 (e.g., disabling the D-pad functionality) may therefore still allow the touch sensor 808 of the control 800 to function. Removing of the lockout feature may permit the control 800 to be depressible and function as a D-pad.

In some instances, the lockout features of the control 800 (or the controller) may be mechanically enabled and/or disabled by the user (e.g., insertable wedge, slide, etc.) and/or one or more motors of the controller. Additionally, or alternatively, the lockout may be enabled and disabled automatically via the controller (or remote device) and based on the game or current application being operated. For example, in certain implementations, the D-pad functionality of the control 800 may not be needed, the application may not be capable of receiving D-pad inputs, and so forth. In response to this determination, the D-pad may be disabled automatically by the controller. For example, logic or processors of the controller system may cause the lockout features to be implemented and prevent the control 800 being depressible. Conversely, when the game or application is configured to be operated using the D-pad, the D-pad functionality may be enabled. However, in some instances, depending on user preferences, the D-pad functionality may be enabled and disabled. For example, in certain applications users may desire the D-pad to be disabled, while in other applications, the user may desire the D-pad to be disabled. In some instances, disabling the D-pad may correspondingly disable the FSRs 806 generating data indicating an amount of force associated with the touches. However, in some instances, the FSRs 806 may be integrated into the control 800, vertically above or beneath the touch sensor 808, and may still operate in instances where the touch sensor 808 is disabled. In some embodiments, the lockout feature may disable the D-pad functionality of the control 800 by disabling the control 800 from being independently depressible at one of multiple (e.g., four) actuatable areas, yet the control 800 may be still be depressible as a whole (e.g., all switches 804 may be actuated simultaneously by depressing the control 800, but each switch 804 may be prevented from being depressed without also depressing the remaining switches 804 at the same time while the lockout feature is enabled).

Figure 9A:
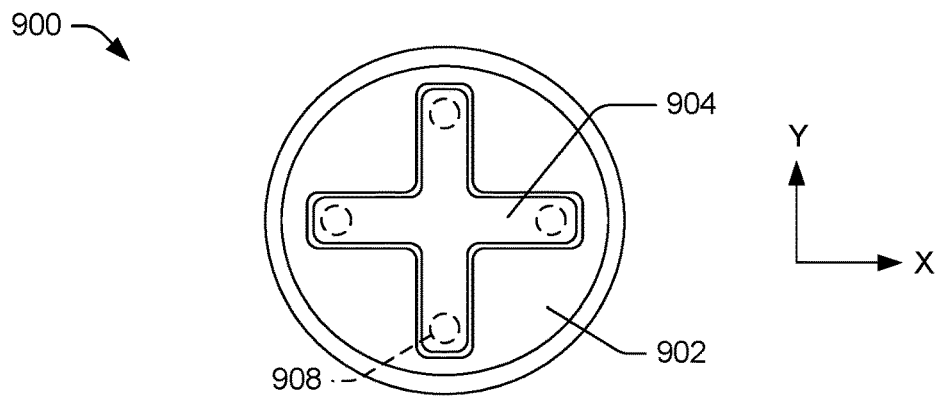
FIG. 9A illustrates a top view of an example front-surface control that includes, in part, a touch sensor and a directional pad (D-pad) for engaging with one or more actuatable switches of a handheld controller for detecting a press at the control. Pressure sensor(s) may also detect an amount of force associated with the press at the control.
Figure 9B:
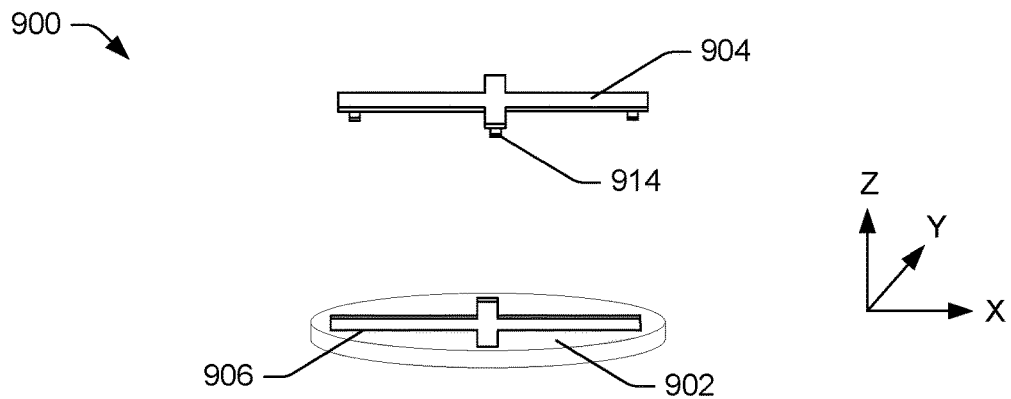
FIG. 9B illustrates an exploded perspective view of the front-surface control of FIG. 9A, showing the control including a receptacle for receiving the D-pad.
Figure 9C:
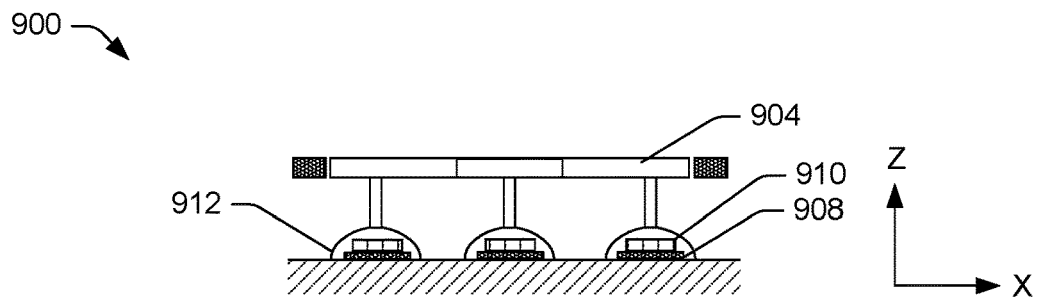
FIG. 9C illustrates a side view of the front-surface control of FIG. 9A, showing the one or more projections for engaging the one or more actuatable switches disposed within a controller body of the handheld controller, beneath example collapsible structures. Pressure sensor(s) may also detect an amount of force associated with the press at the control.

FIGS. 9A-9C illustrate an example control 900 having a trackpad 902 and a D-pad 904. As shown, the trackpad 902 may be generally circular in shape, with a cross-shaped cutout 906 in the middle. This cutout 906 may form an area, or opening, occupied by the D-pad 904 when the D-pad 904 couples to the controller or when the control 900 is assembled. In this sense, the control 900 may act as a touch sensor (via the trackpad 902) and D-pad (via the D-pad 904) for detecting touch and presses at the control 900. In some instances, the control 900 may resemble, represent, and/or be used for, the trackpads (e.g., trackpad 108, trackpad 118, trackpad 508, trackpad 514) of the controller 100 and/or the controller 500, and/or the D-pad 110 of the controller 100 and/or the D-pad 510 of the controller 500.

Disposed underneath each corner or depressible direction (e.g., up, down, left, right) of the D-pad 904 may be a switch 908 for detecting presses. The switches 908 may detect presses of the D-pad 904 at their corresponding locations. In some instances, the trackpad 902 may remain stationary (i.e., not depressible) while the D-pad 904 may be depressible in four directions (e.g., left, right, up, and down) to engage the switches 908. For example, the user may press right, left, up, and down on the D-pad 904 for depressing an associated switch 908, while the trackpad 902 remains stationary and does not depress. The D-pad 904 may therefore be depressible within the trackpad 902 and allowed to depress while the trackpad 902 may remain stationary and sense the presence, location, and gesture of touches. The D-pad 904 may reside within the trackpad 902, such as the center. For example, the trackpad 902 or a body of the control 900 may include a cutout in the shape of the D-pad (e.g., cross) and the D-pad 904 may reside within the cutout of the trackpad 902. The trackpad and the D-pad may be separately addressable or actuatable and configured to receive their own respective inputs.

The trackpad 902 and the D-pad 904 may have minimal spacing therebetween to provide a substantially seamless feel to the user. For example, a size of the D-pad 904 may be slightly smaller than a size of the cutout 906 in the trackpad 902 to provide a substantially seamless appearance and feel. As such, there may be minimal spacing between an exterior surface (or edge) of the D-pad 904 and an interior surface of cutout 906. However, the spacing between the D-pad 904 and the trackpad 902 may provide enough tolerance to permit the D-pad 904 to be depressible.

In some instances, a surface of the D-pad 904 may be substantially continuous with a surface of the trackpad 902 such that a contour of the D-pad 904 may be complimentary with a contour of the trackpad 902, vice versa. For example, the trackpad 902 may include a concave shape and the D-pad 904 may follow, mirror, or be complimentary to the concave features of the trackpad 902. The complimentary contours of the trackpad 902 and the D-pad 904 may provide a smooth surface for the user when operating the controller.

Additionally, or alternatively, in some instances, the D-pad 904 may be slightly raised above, or lowered beneath, a surface of the trackpad 902 to provide physical feedback and allow the user to locate the D-pad 904 within the trackpad 902, or on the control 900. For example, by slightly raising the surface of the D-pad 904 above the surface of the trackpad 902, or in relation to the trackpad 902, the user may sense (e.g., feel) where the D-pad 904 is located, and/or where the D-pad 904 is depressible (e.g., left, right, up, and down). Therein, the user may locate a corresponding direction of the D-pad 904 to depress.

In some instances, the control 900 or portions of the controller may include FSR(s) 910 for sensing an amount of force applied to areas of the trackpad 902 and/or an amount of force applied to particular buttons (or directions) on the D-pad 904. In some instances, the FSR(s) 910 may be disposed beneath the control 900, within the controller, and/or may be disposed on the control 900 itself. For example, the FSR(s) 910 may be disposed or adhered to the trackpad 902 and/or the D-pad 904. In some instances, the FSR(s) 910 may be adhered to a cover of the trackpad 902 and/or a cover of the D-pad 904. Additionally, as shown in FIG. 9C, the FSR(s) 910 may be disposed beneath resilient domes 912. The resilient domes 912 may be depressible via projections 914 extending from the D-pad 904, or areas of the D-pad 904 corresponding to up, down, left, and right. When the user presses a particular direction on the D-pad 904 a corresponding press may be sensed via the switch underlying the particular projection 914. An associated FSR 910 may also detect an amount of force associated with the press. The switches 908 and/or the FSRs 910 may therefore be engaged or sense a press based on the projection 914 collapsing the resilient dome 912.

However, although FIG. 9 illustrates a particular embodiment, or organization of the switches 908 and/or the FSRs 910, the switches 908 and/or the FSRs 910 may be located elsewhere on the control 900 and/or within the controller for sensing a press at the control 900 and an amount of force associated with the press. Additionally, the switches 908 and/or FSRs 910 may be engaged using mechanisms other than the projections 914.

The switches 908 and the FSRs 910 may each couple (e.g., via a connector, transceiver, etc.) to the one or more processors (e.g., PCBs) of the controller system (e.g., a processor(s) within the controller body, processor(s) of a separate computing device, etc.) such that press of the control 900 may result in selection data, indicative of a press of the control 900, being provided from the switch 908 and the FSRs 910 to the processors. The FSRs 910 may provide force data, indicative of an amount of force of the press, to the processors. Along with the touch data, the selection data and/or force data may be provided to a game or other application for interpreting the data as one or more commands. In some instances, the touch data, the selection data, and/or the force data may be interpreted together and associated with a predefined command. In some instances, a remote system (e.g., a host computing device, a game console, etc.) that the controller is interacting with may determine the presence and/or location of the touch, and/or the amount of force associated with the touch (or press).

As discussed above with regard to the control 800, in some instances, the control 900, or a controller within which the control 900 is implemented, may include a lockout feature. The lockout may prevent portions of the control 900 being depressible, such as the D-pad 904. For example, the lockout may slide between the control 900 and the controller, the controller may include an actuatable slide inserted within the control 900, and/or the lockout may be inserted within an aperture of the controller in which the control 900 resides to prevent the control 900 being depressible. The lockout may prevent the D-pad 904 being depressible (i.e., defeature the D-pad 904) but may permit the trackpad 902 (e.g., the touch sensor of the trackpad 902 and/or the touch sensor on the D-pad 904) to receive touch input for determining the presence of a touch, a location of the touch, and/or a gesture. In some instances, the lockout features of the control 900 (or the controller) may be mechanical enabled and/disabled by the user and/or one or more motors of the controller. Additionally, or alternatively, the lockout may be enabled and disabled automatically via the controller and based on the game or current application being operated by the controller.

In some instances, the D-pad and/or the switches beneath the control (which function as the D-pad), may be backlit to indicate the location of the D-pad on/within the control and/or the location of the switches beneath the control. The illumination may be turned on to reveal the location of the D-pad and/or switches, and turned off to conceal the location of the D-pad and/or switches (e.g., in instances where the D-pad and/or the switches are disabled). In some instances, the control or a cover of the control may include micro lacerations (e.g., slits, openings, holes, etc.) to allow light emitted by light emitting elements to pass through the control (or portions thereof) and to be emitted external to the handheld controller. Additionally, components of the control (e.g., trackpad) may be manufactured from a double-shot material that includes transparent and non-transparent material. The transparent material allows light to pass through and indicate the location of the switches and/or the D-pad. Additionally, or alternatively, portions of the control may include thinned regions to allow light to pass therethrough. In instances where the control includes a trackpad having cutout for the D-pad, emitted light may pass through or within the cutout, between a wall of the cutout and the D-pad.

In some instances, the light emitting elements may also indicate a functionality or mode of the control. For example, in instances where the D-pad is enabled or configured to receive input, the D-pad may be illuminated (e.g., the control may illuminate to have a D-pad shape). In instances where the D-pad is disabled (e.g., mechanical lockout) and the trackpad is enabled, for example, the trackpad may be illuminated (e.g., the control may illuminate to have a circular outline shape). Accordingly, the control may include a first state (or mode) of illumination to indicate D-Pad mode and second state (or mode) of illumination to indicate trackpad mode. However, the control may have a mode where the D-pad and the trackpad are useable simultaneously.

Figure 10A:
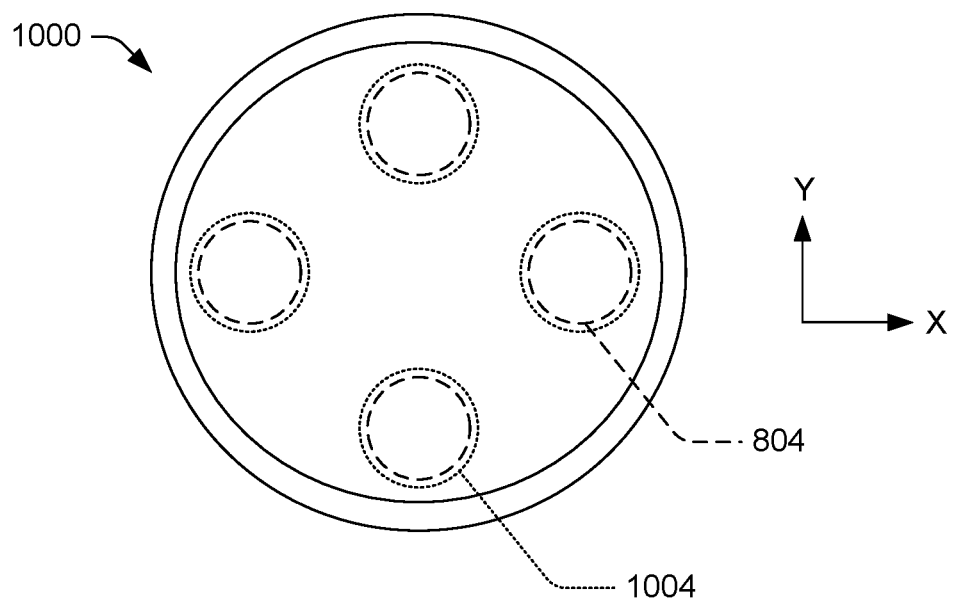
FIG. 10A illustrates a top view of an example front-surface control that includes, in part, a touch sensor and one or more actuatable switches of a handheld controller for detecting a press of the control. One or more light emitting elements may indicate the location of the one or more switches beneath the control.
Figure 10B:
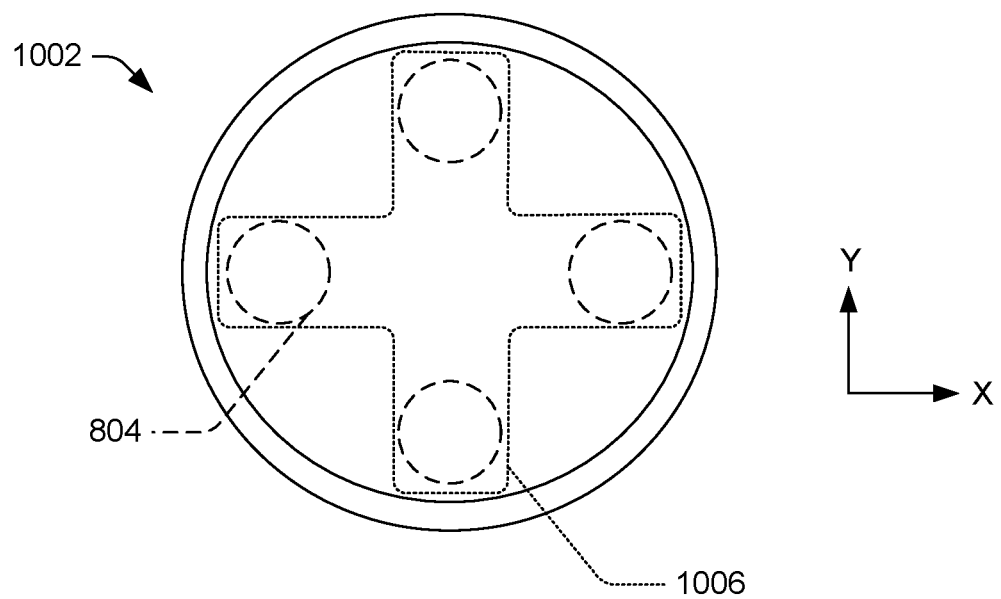
FIG. 10B illustrates a top view of an example front-surface control that includes, in part, a touch sensor and a directional pad (D-pad) for engaging with one or more actuatable switches of a handheld controller for detecting a press at the control. One or more light emitting elements may indicate a location of the D-pad beneath the control.

FIGS. 10A and 10B illustrate example controls 1000 and 1002, respectively, having backlighting features. The control 1000 and/or the control 1002 may have holes or other features for permitting light to shine or pass through a cover or body thereof. For example, light emitting components (e.g., light emitting diodes (LEDs), organic light emitting diodes (OLEDs), etc.) may be disposed within the controller and oriented to emit light through a surface of the control 1000 and/or the control 1002. In some instances, the controller or the controls may include diffusers or light guides to direct the emitted light towards the surface of the controls. Additionally, or alternatively, the light emitting components may be disposed on portions of the control 1000 and/or the control 1002. In some instances, the control 1000 and/or the control 1002 may resemble, represent, and/or be used for, the trackpads (e.g., trackpad 108, trackpad 118, trackpad 508, trackpad 514) of the controller 100 and/or the controller 500, and/or the D-pad 110 of the controller 100 and/or the D-pad 510 of the controller 500.

The control 1000 and/or the control 1002 may include micro lacerations (e.g., slits, holes, etc.) to allow light emitted by light emitting component to emit through the surface. Additionally, the control 1000 and/or the control 1002 may be manufactured from a double-shot material, including transparent and non-transparent material, where the transparent material allows the light to pass therethrough. Additionally, or alternatively, portions of the control 1000 and/or the control 1002 may include thinned regions to allow light to pass through. For the control 1002, and in instances where the control includes a cutout for the D-pad, emitted light may pass through or within the cutout, between a wall of the cutout and the D-pad.

The light emitting components may serve to indicate a location of the buttons, or switches, within the controller. For example, the light may pass through the controls to indicate portions of the control corresponding to the D-pad. For FIG. 10A, for example, the light may shine through a top cover of the control 1000 to indicate that the user may press up, down, left, or right on the control 1000 to activate the switches. That is, the light may indicate the location of the switches beneath the control 1000 to visually illustrate the switches beneath the control 1000. The light may shine through respective portions of the control 1000 (or the trackpad) to visually indicate to the user where the buttons are on the control 1000, for operating the control 1000 as a D-pad. For example, as shown in FIG. 10A, the switches 804 disposed beneath the control 1000 and the location of these switches 804 may be indicated by openings 1004 that surround or encircle the switches 804. Noted above, light may be emitted through these openings 1004 to indicate the presence or location of the switches 804 and that the user may operate the control 1000 as a D-pad. However, rather than the openings 1004 encircling switches 804, the openings 1004 may indicate the associated features of the D-pad (e.g., left arrow, right arrow, up arrow, down arrow). Alternatively, the openings 1004 or their arrangement on the control 1000 may be shaped differently than shown. For example, the openings 1004 may form a square outline or a hexagonal outline.

For FIG. 10B, the light may indicate the location of the D-pad within the control 1002. In this sense, in FIG. 10B, the light may outline the shape of the D-pad within the control 1002. For example, the control 1002 may include openings 1006 that are arranged in a cross shape. That is, rather than having the openings 1004, which include four circles shining through the cover of the control 1000, FIG. 10B illustrates that the shape of the D-pad may be outlined on the cover of the control 1002 via the light emitting components. In some instances, FIG. 10B and the openings 1006 may more clearly indicate to the user that the control 1002 functions as a D-pad (e.g., by including the cross-shaped outline) as compared to including four circles (e.g., FIG. 10A). Regardless, the control 1000 and/or the control 1002 may be operable to depress the respective switches 804 for causing one or more actions to be performed. The openings in the controls, whether 1004 or 1006, may visually indicate the functionalities of the controls and that the user may click on respective portions of the control for depressing the switches 804 therebeneath. In some instances, the controller may backlight the controls in response to receiving or sensing a touch at the controls, determining that the control is being operated, or may continuously illuminate the controls.

Figure 11A:
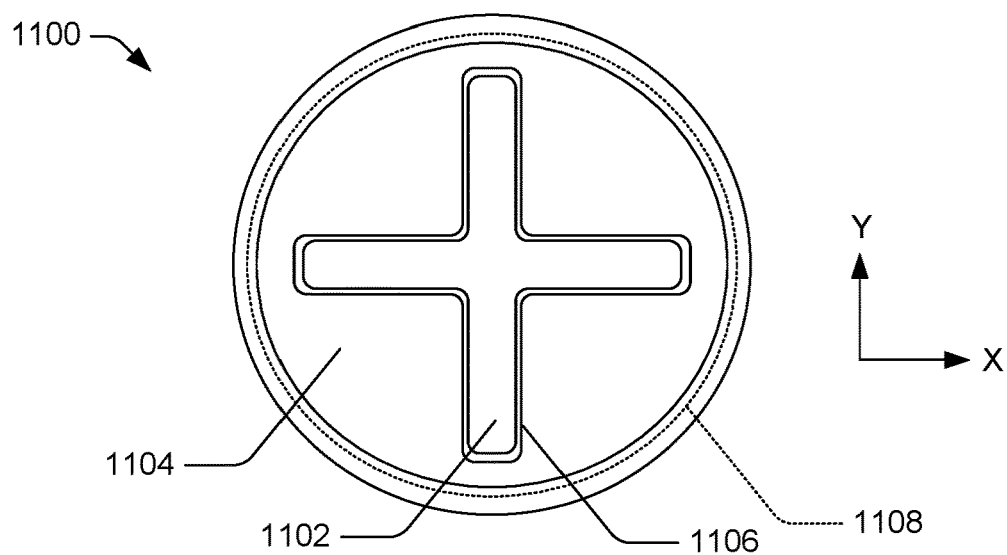
FIG. 11A illustrates a top view of the front-surface control of FIG. 9A. One or more light emitting elements may indicate a first mode of the control in instances where the touch sensor is enabled. In some instances, in the first mode, the D-pad of the control may be disabled.
Figure 11B:
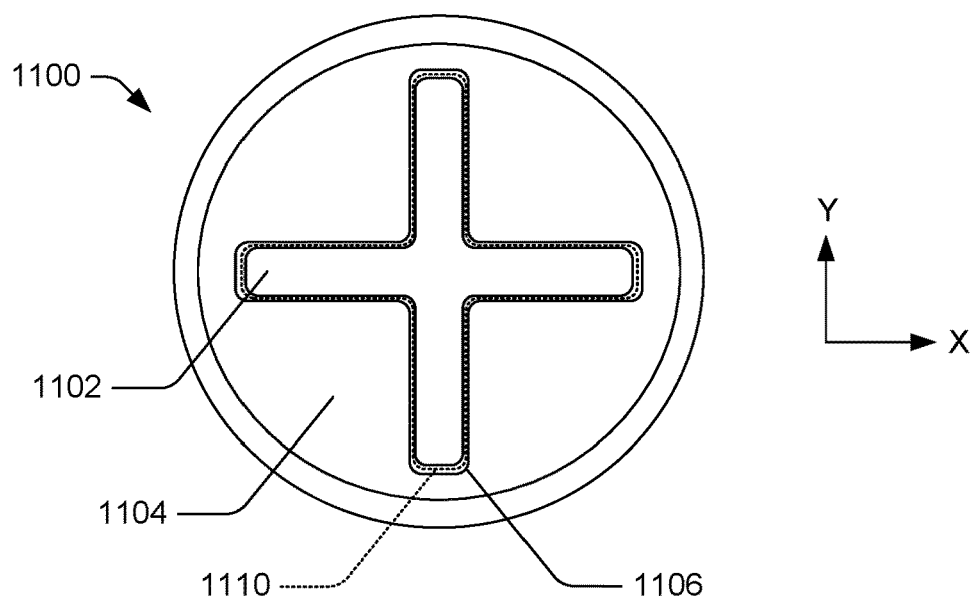
FIG. 11B illustrates a top view of the front-surface control of FIG. 9A. One or more light emitting elements indicate a second mode of the control in instances where the D-pad is enabled. In some instances, in the second mode, the touch sensor of the control may be disabled.

FIGS. 11A and 11B illustrate utilizing light emitting components of a controller for visually indicating various states, or modes, of a control 1100. In some instances, the control 1100 may represent, or be similar to, the control 900. For example, the control 1100 may include a D-pad 1102 surrounded by a trackpad 1104. The D-pad 1102 may be disposed, or reside, within a cutout 1106 of the trackpad 1104. As such, the control 1100 may be operable as a D-pad and a touch sensor. In some instances, the control 1100 may resemble, represent, and/or be used for, the trackpads (e.g., trackpad 108, trackpad 118, trackpad 508, trackpad 514) of the controller 100 and/or the controller 500, and/or the D-pad 110 of the controller 100 and/or the D-pad 510 of the controller 500.

The control 1100 may be illuminated, or respective portions of the control 1100 may be illuminated to indicate a functionality of the control 1100. For example, in FIG. 11A, the trackpad 1104 may be enabled and the light emitting components may be configured to emit light around an outer ring, or perimeter, of the trackpad 1104. For example, FIG. 11A illustrates an outline 1108 disposed around an outer perimeter of the trackpad 1104. This outline 1108 (e.g., halo) may be generated via light emitting components disposed within the controller, beneath the control 1100, that emit light. The light may therefore illuminate around the trackpad 1104, in the shape of the outline 1108. In such instances, the D-pad 1102 may be disabled and/or not capable of sensing or receiving touch input (e.g., presses). As such, to visually indicate this to the user and that the D-pad 1102 is disabled, the D-pad 1102 may not be illuminated or light may not outline the D-pad 1102 within the control 1100. However, in this mode, the trackpad 1104 may be configured as a touch sensor and receiving input from the user. The user or the controller, depending on the application being controlled, may switch functionality of the control 1100. In such instances, the control 1100 may illuminate to a second appearance state or mode.

For example, as shown in FIG. 11B, light emitting components of the controller may illuminate the control 1100 to indicate or outline the D-pad 1102. Here, as discussed above, the light emitted via the light emitting components may shine through the cutout within which the D-pad 1102 resides, in the shape of an outline 1110. As shown, the outline 1110 may generally include a cross shape to resemble the D-pad. Here, in this mode, or when the D-pad 1102 is backlit, the D-pad 1102 may be configured to receive input from the user and engage the switches disposed therebeneath. That is, in FIG. 11B the illumination of the D-pad 1102 may indicate that the user may utilize the D-pad 1102 or that the D-pad 1102 is functional to receive input. In such instances, the light emitting components around the periphery of the trackpad 1104 which indicate the functionality of the trackpad 1104 (as shown in FIG. 11A), may be disabled. However, as discussed above, in some instances, the control 1100 may be usable as a D-pad and a touch sensor. In such scenarios, both the trackpad 1104 and the D-pad 1102 may be illuminated (as shown in FIGS. 11A and 11B, respectively).

Moreover, in some instances, the trackpad 1104 and the D-pad 1102 may be illuminated responsive to detecting presses, touch, or other input. For example, when the user touches the trackpad 1104, the control 1100 may be illuminated to indicate that the user is operating the trackpad 1104 portion of the control 1100 (e.g., as shown in FIG. 11A). When the user touches, or presses, on portions of the D-pad 1102, the control 1100 may be illuminated to indicate that the user is operating the D-pad 1102 portion of the control 1100 (e.g., as shown in FIG. 11B). The light emitting components of the controller may therefore indicate a current functionality of the control 1100.

More generally, the control 1100 may be illuminated to indicate a current mode or functionality of the control (e.g., inputs capable of being received and/or detected). In this sense, the control 1100 may switch between modes depending on configurations of a controller in which the control 1100 is implemented and/or preferences of the user. Regardless, the control 1100 may visually indicate, via the backlights, the functionalities of the control 1100. Moreover, in some instances, the controller may include respective light emitting components for displaying the modes of the control 1100. For example, first light emitting components may illuminate to indicate the first mode and second light emitting components may illuminate to indicate the second mode. The light emitting components may be turned on and off depending the configuration of the control, as determined by the controller. For example, in the first mode, processors of the controller may cause the first light emitting components to illuminate and indicate the trackpad 1104 functionality, as shown in FIG. 11A, and in the second mode, the processors may cause the second light emitting components to illuminate and indicate the D-pad 1102 functionality, as shown in FIG. 11B. In some embodiments, the control 1000, the control 1002, and/or the control 1100 having light features may be inconspicuous or hidden when the light emitting elements of the control are not emitting light, and the location of the control on the controller body may be revealed (e.g., become conspicuous) when the light emitting elements emit light. For example, the front of the controller body may not include any features of the control 1000/1002/1100 that are visible to the naked eye when the light emitting elements of the control are turned off and not emitting light, such as a flush front surface. When the light emitting elements are turned on, however, the user may be able to see, and, hence, determine, where the control 1000/1002/1100 is located on the controller body.

Figure 12:
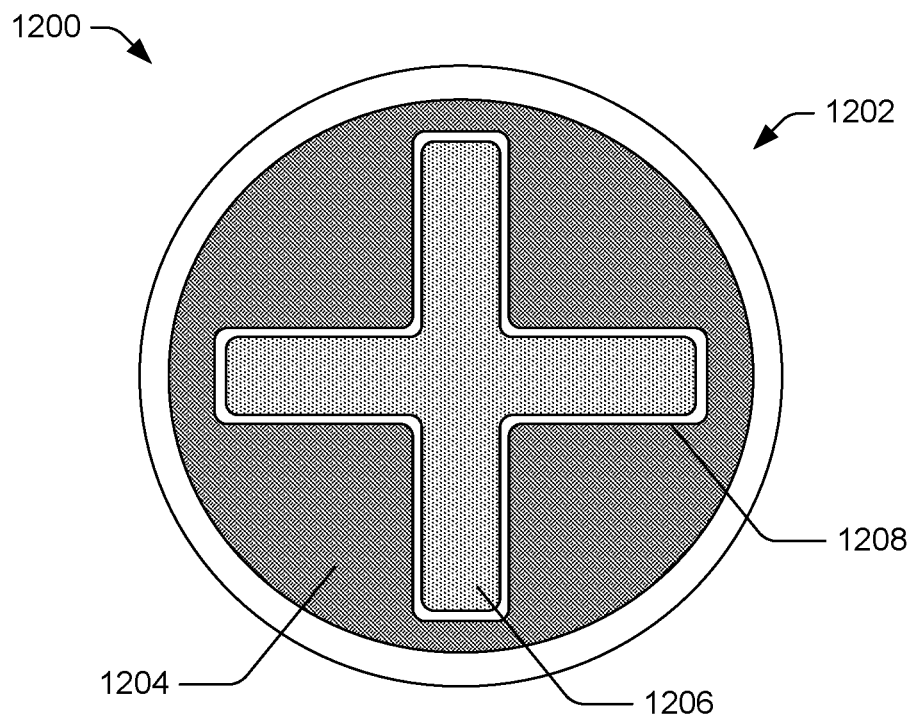
FIG. 12 illustrates a top view of an example front-surface control that includes, in part, a touch sensor and a directional pad (D-pad) for engaging with one or more actuatable switches of a handheld controller for detecting a press at the control. The control includes a first touch sensor and a second touch sensor, disposed on the D-pad, for detecting a touch at the control.
Figure 12:
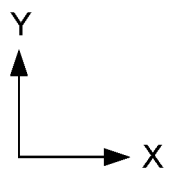

FIG. 12 illustrates a control 1200 having a touch sensor 1202 for sensing touch across the control 1200. In some instances, the control 1200 may resemble, or represent, the control 900. Generally, the touch sensor 1202 may include a first portion 1204, corresponding to a trackpad, and a second portion 1206, corresponding to a D-pad. In some instances, the first portion 1204 may correspond to a first touch sensor, or first capacitive array, while the second portion 1206 may correspond to a second touch sensor, or a second capacitive array. When combined, the first portion 1204 and the second portion 1206 may form the touch sensor 1202. In other words, the D-pad and the trackpad may include separate touch sensors for detecting touch input across the entire control. For example, a first capacitive sensing array 1204 may be disposed on, within, or beneath the trackpad (e.g., a cover of the trackpad). The first capacitive sensing array 1204 may generally be in the shape of a circle (in instances where the trackpad includes a circular shape) with a cutout corresponding to the D-pad. The cutout may correspond to an area or portion of the trackpad in which the D-pad resides. A second capacitive sensing array 1206 may be disposed on, within, or beneath the D-pad (e.g., a cover of the D-pad). The second capacitive sensing array 1206 be in the shape of a cross, where the D-pad is depressible in four directions (e.g., left, right, up, and down). Collectively, the first capacitive sensing array 1204 and the second capacitive sensing array 1206 may form a capacitive array across the surface of the control 1200. As such, as the user moves his or her fingers across the control 1200 (e.g., the trackpad and the D-pad), the control 1200 may sense the presence, location, and/or gesture of a finger(s).

As illustrated the first portion 1204 includes a cutout 1208 in the form of a cross, which may correspond to a shape of the D-pad. The first portion 1204 may be configured to sense touch at the control 1200, outside of the cutout 1208, and on areas of the trackpad. Meanwhile, the D-pad may include the second portion 1206 in the shape of the cross. Collectively, the first portion 1204 and the second portion 1206 may form a capacitive array across substantially all of the surface of the control 1200. As the user moves his or her fingers across the control 1200 (e.g., the trackpad and the D-pad), the control 1200 may sense the presence, location, and/or gesture associated with the touches. In some instances, logic of the controller may combine touches received at the first portion 1204 and the second portion 1206 for combing inputs and determining the presence, location, and/or gesture associated with the touches. In some instances, the controller or a remote device may utilize one or more fusion algorithms for combining inputs received at the first portion 1204 and the second portion 1206. For example, filters in software may combine the outputs of the first portion 1204 and the second portion 1206 to allow the multiple capacitive sensing arrays to function as a complete circular touch sensor. By way of example, if the user glides their finger from the left side of the control 1200 to the right side of the control 1200, across the D-pad, the portions of the touch received at the first portion 1204 and the second portion 1206 may be combined for determining a gesture or swipe of the user. Accordingly, the user may utilize the entire surface of the control (or substantially the entire surface of the control) as a trackpad, and may also use the control as a D-pad.

Additionally, the D-pad may still function as a D-pad and be depressible for detecting presses. As such, the control 1200 may receive touch input across substantially all of the surface of the 1200 and may also act as a D-pad. Given the operation of the D-pad, or the depressible nature of the D-pad, the control 1200 may not include a touch sensor within the cutout 1208 (such that the D-pad is able to depress).

As discussed above, the handheld controller may also include one or more joysticks, commonly referred to as "thumbsticks." In some instances, the joysticks may include a circular base frame with a flexible cross-shaped support member for supporting the joystick. Portions of the flexible cross-shaped support member may be attached to the circular base frame. The flexible cross-shaped support member may permit 360-degree deflection of the joystick, which is mounted within, or at the center, of the flexible cross-shaped support member. Strain gauges may be mounted to portions of the flexible cross-shaped support member to sense a degree of flexure as the user operates the joystick. The degree of flexure may be associated with a certain position of the joystick (e.g., up, down, left, right, push, etc.).

In some instances, the flexible cross-shaped support member may include a plurality of strain gauges located on portions of the flexible cross-shaped support member (or members thereof) for determining a location or position of the joystick. In such instances, each of the strain gauges may sense or generate data representing a respective degree of flexure of a member (or portions) of the flexible cross-shaped support member. The sensed or generated values from the strain gauges, when combined, may indicate a position of the joystick.

Figure 13A:
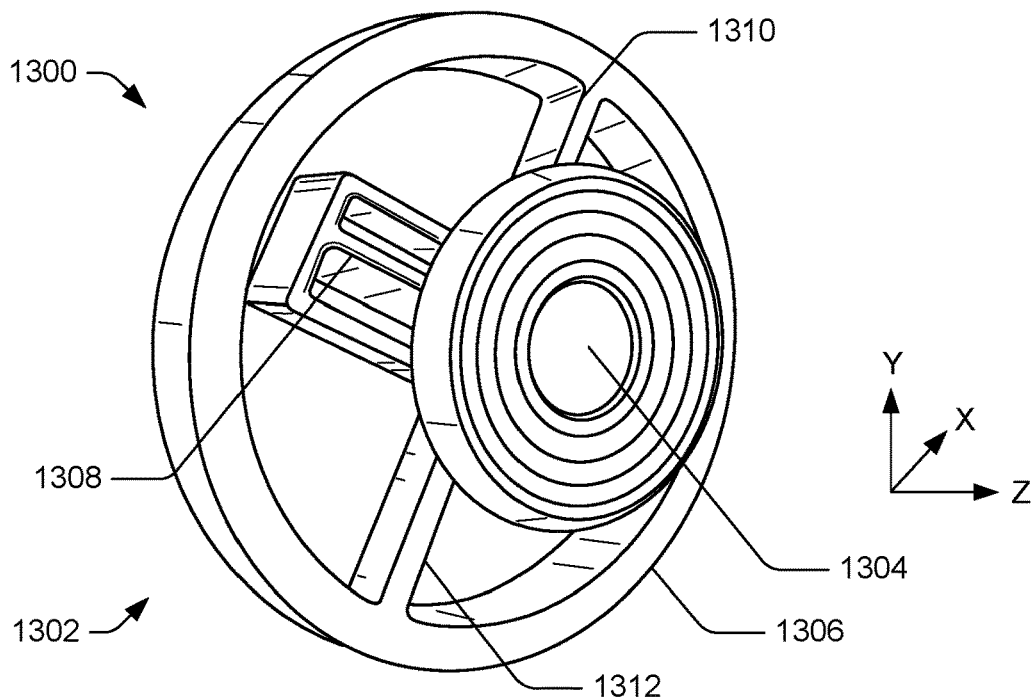
FIG. 13A illustrates a front perspective view of an example control that includes, in part, a touch sensor and a support member. Strain gauges may couple to portions of the support member for determining an amount of flexure of the support member.
Figure 13B:
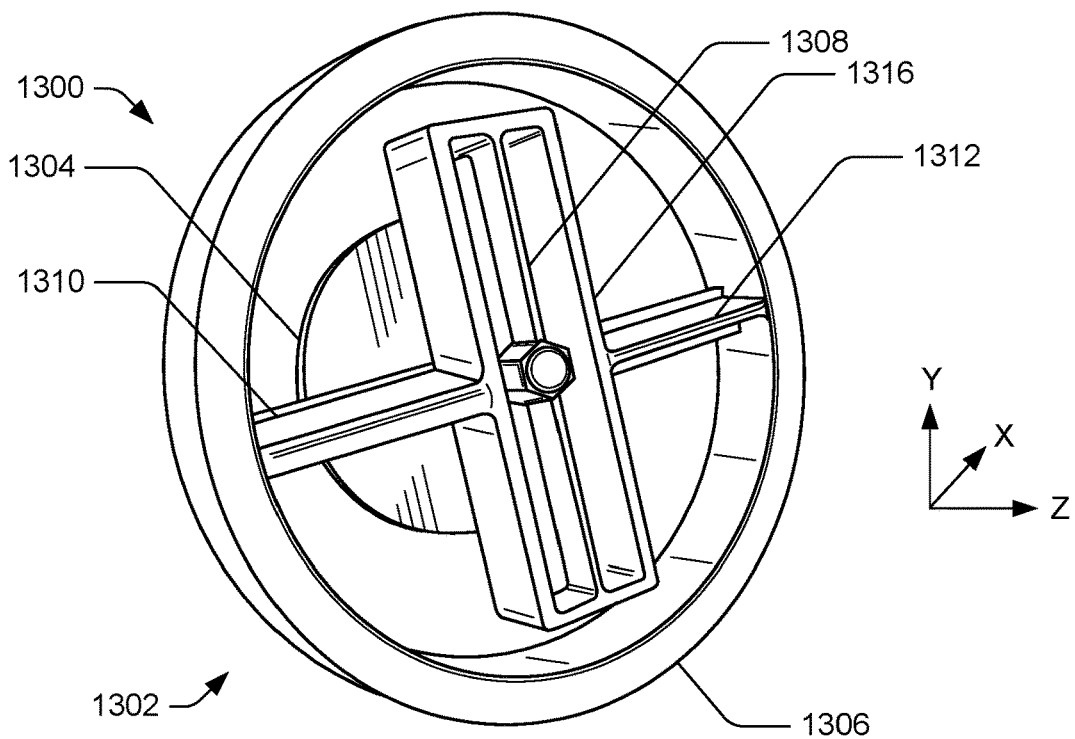
FIG. 13B illustrates a rear perspective view of the control of FIG. 13A, showing the support member of the control.
Figure 13C:
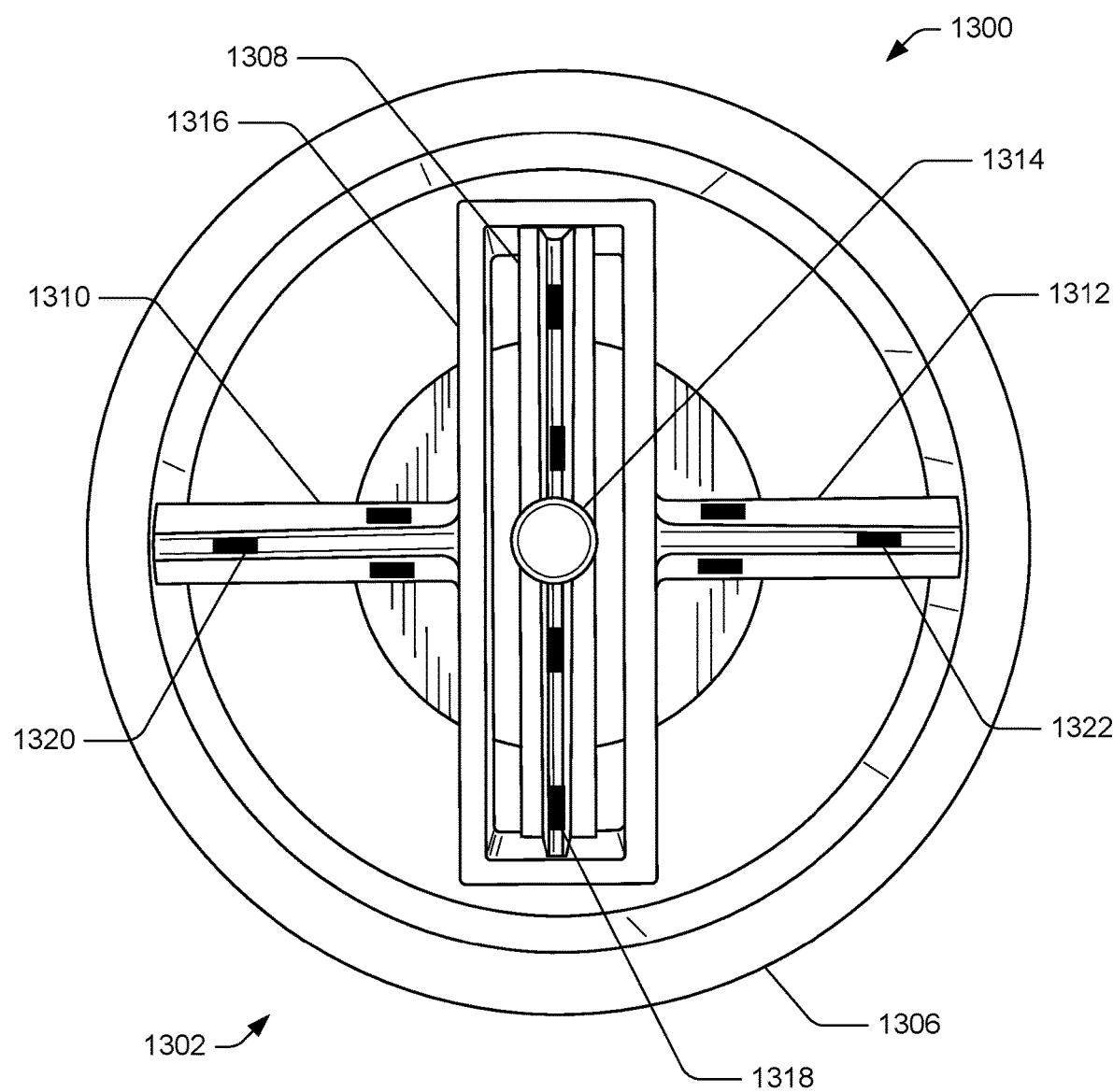
FIG. 13C illustrates a rear view of the control of FIG. 13A, showing the strain gauges of the control for detecting an amount of flexure.

FIGS. 13A-13C illustrate various views of an example control 1300. FIG. 13A illustrates a front perspective view of the control 1300, FIG. 13B illustrates a rear perspective view of the control 1300, and FIG. 13C illustrates a rear plane view of the control 1300. In some instances, the control 1300 may resemble or represent a thumbstick or joystick operable by a thumb of a user when the control 1300 couples or is disposed with a controller. In some instances, the control 1300 may resemble, represent, and/or be used for, the joysticks (e.g., joystick 106, joystick 116, joystick 506, joystick 512) of the controller 100 and/or the controller 500.

The control 1300 includes a support member 1302 for supporting a thumbstick 1304 that is operable by the thumb of the user. Portions of the support member 1302 may operably couple the thumbstick 1304 to a circular base frame 1306, or other member disposed around the thumbstick 1304. The support member 1302 may support or hold the control 1300 within a controller. For example, the support member 1302, such as the circular base frame 1306, may couple to the controller (or controller body) for positioning the thumbstick 1304 on a front a controller and for use by a user.

The support member 1302 may include features to allow the thumbstick 1304 to maneuver (e.g., rotate) within the controller. For example, as shown, the support member 1302 may, in some instances, include cross shaped features which are flexible to permit the thumbstick 1304 to experience 360-degree deflection. By way of example, the support member 1302 may include a first member 1308, a second member 1310, and a third member 1312. The first member 1308, the second member 1310, and/or the third member 1312 may each be flexible (e.g., ratable, bendable, pushed, pulled, etc.) to permit the thumbstick 1304 to rotate and maneuver.

The first member 1308 may couple to the thumbstick 1304 via a post 1314. The first member 1308 is also shown disposed within a housing 1316. In some instances, the housing 1316 may include a generally rectangular shape. The first member 1308 may couple to the housing 1316 at opposing ends. For example, a first end of the first member 1308 may couple to the housing 1316 at a first end, while a second end of the second member 1310 may couple to an opposing second end of the housing 1316. In some instances, the coupling of the first member 1308 within the housing 1316, or the points at which the first member 1308 couples to the housing 1316, may allow the thumbstick 1304 to maneuver in left and right positions. Additionally, as shown, the housing 1316 may be disposed away from and may not couple to the circular base frame 1306. Such offset may permit the joystick to maneuver within the circular base frame 1306.

The second member 1310 and the third member 1312 may couple on opposite sides or surfaces of the circular base frame 1306 as well as the housing 1316. For example, the second member 1310 may include a first end that couples to a first side, or surface, of the circular base frame 1306 and a second end that couples to a first side of the housing 1316. The third member 1312 may include a first end that couples to a second side, or surface, of the circular base frame 1306 and a second end that couples to a second side of the housing 1316, opposite the first side of the housing 1316. In some instances, the second member 1310 and/or the third member 1312 may be oriented orthogonal or perpendicular to the first member 1308 (or the housing 1316). In some instances, the coupling of the second member 1310 and the third member 1312 to the circular base frame 1306 and the housing 1316 may allow the thumbstick to maneuver in upward and downward positions.

Accordingly, via the first member 1308, the second member 1310, the third member 1312, and their respective coupling with the housing 1316 and/or the circular base frame 1306 may allow the thumbstick 1304 to maneuver in 360 degrees. In some instances, the thumbstick 1304 may be mounted within, or at the center, of the support member 1302.

The first member 1308, the second member 1310, and/or the third member 1312 may include a shape, or features, that permit the thumbstick 1304 to maneuver as described above. For example, first member 1308, the second member 1310, and/or the third member 1312 may include a shape that allows the first member 1308, the second member 1310, and/or the third member 1312 to flex, bend, and/or rotate, respectively. By way of example, the first member 1308, the second member 1310, and/or the third member 1312 may include certain cross-sectional shapes/features that allow for flexing. In some instances, the cross-section may be cross-shaped, T-shaped, ovular, or circular. Such cross-section may allow the first member 1308, the second member 1310, and/or the third member 1312 to flex and permit the thumbstick 1304 to maneuver. In some instances, the cross-section may be uniform across a length of the members, or the cross-section may vary in size and/or shape along the length of the members.

The cross-section of the first member 1308, the second member 1310, and/or the third member 1312 may also be modified or varied to adjust the amount of force or pressure required by the user to flex or maneuver the thumbstick 1304. For example, to make the thumbstick 1304 more rigid, the thumbstick 1304 may include different shapes or thicknesses.

To sense a movement of the thumbstick 1304, strain gauges may be mounted to portions of the support member 1302. The strain gauges may sense a degree of flexure associated with each of the members. For example, as shown in FIG. 13C, one or more first strain gauges 1318 may be mounted to the first member 1308 to measure an amount of flexure experienced by the first member 1308 the thumbstick 1304 is operated by the user. Additionally, or alternatively, one or more second strain gauges 1320 may be mounted to the second member 1310 to measure an amount of flexure experienced by the second member 1310. Additionally, or alternatively, one or more third strain gauges 1322 may be mounted to the third member 1312 to measure an amount of flexure experienced by the third member 1312.

The degree of flexure experiences by the first member 1308, the second member 1310, and the third member 1312 may be associated with a certain position of the thumbstick 1304 (e.g., up, down, left, right, push, etc.). For example, based on the movement of the thumbstick 1304, the members may each experience a certain degree of flex. This flex may be detected by the strain gauges, or the strain gauges may generate data indicative of the strain experienced. In some instances, each of the strain gauges may sense a respective degree of flexure of the members, which when combined, may indicate a position of the thumbstick 1304. That is, knowing the strain experienced by each strain gauge may allow for the position and direction of the thumbstick to be determined.

Each of strain gauges of the first member 1308, the second member 1310, and the third member 1312 may communicatively couple (e.g., via a connector, transceiver, etc.) to one or more processors (e.g., PCBs) of the controller system (e.g., a processor(s) within the controller body, processor(s) of a separate computing device, etc.) such that positions of the thumbstick 1304 may be determined. The data, or the position of the thumbstick 1304, may be provided to a game or other application for interpreting the data as one or more commands, such as a controlling a position of a user within an environment. In some instances, a remote system (e.g., a host computing device, a game console, etc.) that the controller is interacting with may receive the data from the strain gauges and determine an amount of flexure of the thumbstick 1304 and/or a position of the thumbstick 1304 for performing a command.

In some instances, the one or more first strain gauges 1318, the one or more second strain gauges 1320, and/or the one or more third strain gauges 1322 may couple to the first member 1308, the second member 1310, and the third member 1312, respectively, at various locations along a length of the members or at different positions on a cross-section of the members. For example, the strain gauges may couple to a top, bottom, and/or side of the first member 1308, the second member 1310, and the third member 1312, to sense the degree of flexure of the first member 1308, the second member 1310, and the third member 1312, respectively.

In some instances, the user may push on the thumbstick 1304 and the amount of flexure and the degree of flexure experienced by the first member 1308, the second member 1310, and the third member 1312, respectively, may be determined for use in detecting a press and/or an amount of force associated with the press. Furthermore, in some instances, the thumbstick 1304, such as a top of the thumbstick 1304, may include a touch sensor or trackpad for sensing a movement of a thumb or fingers of the user. Including a trackpad on the top of the thumbstick 1304 permits the thumbstick 1304 to be utilized as a trackpad for detecting the presence, location, and/or gesture associated with touches on the thumbstick 1304. In some instances, the thumbstick 1304 may be utilized as the trackpad without deflecting the thumbstick 1304.

In some instances, a cap, or top, of the joystick may include a touch sensor (e.g., capacitive sensing array) for sensing a movement of the thumb or fingers of the user. Including a touch sensor on the top of the joystick may permit the joystick to operate as a trackpad for detecting the presence, location, and/or gesture associated with touches on the joystick. In some instances, the joystick may be utilized as a trackpad without deflecting the joystick. In some instances, the joystick may be utilized as a joystick without utilization of the trackpad. However, in some instances, the joystick may both serve as a joystick as well as a trackpad to simultaneously detect a position/deflection of the joystick and a presence, touch, or gesture on the trackpad.

In some instances, the joystick of the handheld controller may include capacitive sensors, or other electrodes, spaced apart on the top of the joystick to sense movement of the thumb. The electrodes may detect initial movement of the thumb using the capacitive electrodes, and prior to, the handheld controller sensing movement of the joystick. For example, conventional handheld controllers may include a "deadband" that is associated with a potentiometer detecting an initial movement of the joystick and which is undetectable by the handheld controller. For example, in some instances, the initial movement may be undetectable until the joystick deflects or is moved by a threshold amount. In such instances, the user may begin to deflect the joystick but a corresponding movement in the video game (e.g., cursor movement) may not occur until after a threshold amount of displacement detectable by the potentiometer. As disclosed herein, to detect this initial movement, multiple capacitive electrodes on a cap of the joystick may detect an initial movement of the thumb across the cap of the joystick. The capacitive electrodes may detect a direction of movement of the thumb to control a corresponding aspect of a video game in accordance with the direction of movement. In some instances, the capacitive electrodes may continue to detect the movement (and/or direction) until the potentiometer starts detecting deflection of the joystick.

The joystick, or the cap or top surface of the joystick, may include any number of capacitive electrodes. For example, the joystick may include a first capacitive electrode located in the center of the cap and three capacitive electrodes radial disposed around the center of the cap.

Figure 14:
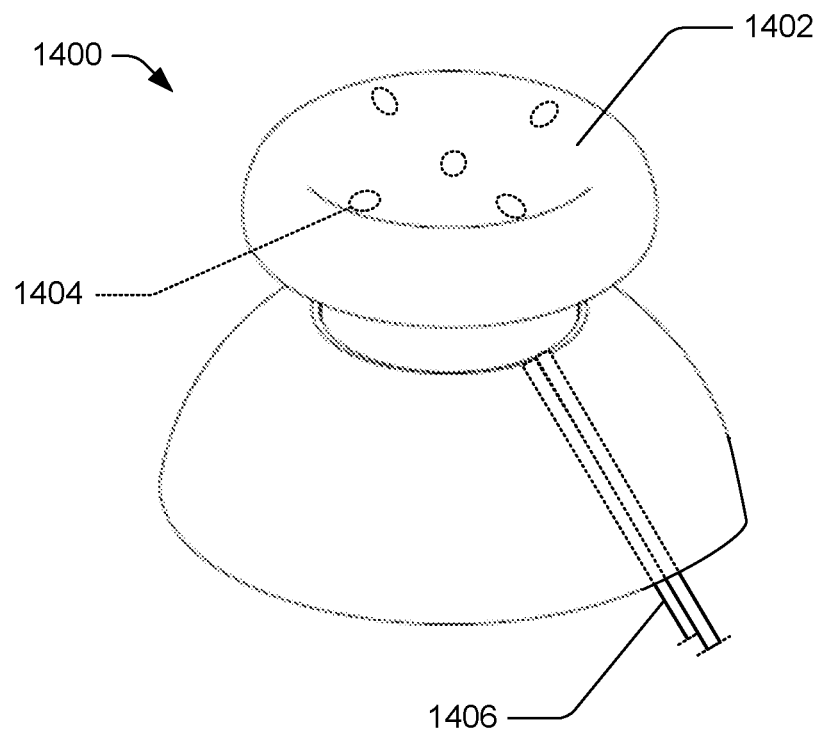
FIG. 14 illustrates a front perspective view of an example control that includes, in part, one or more electrodes for sensing a movement of one or more finger(s) of a user operating the control. In some instances, the one or more electrodes may sense initial movement of a thumb on the control prior to a potentiometer detecting movement of the control.
Figure 14:
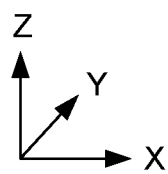

FIG. 14 illustrates an example control 1400, which in some instances, may resemble a thumbstick operable by a thumb of the user. In some instances, the control 1400 may include a trackpad (e.g., capacitive sensing array) for sensing movement of the thumb or fingers of the user across a top 1402 or surface of the control 1400. In some instances, the control 1400 may resemble, represent, and/or be used for, the joysticks (e.g., joystick 106, joystick 116, joystick 506, joystick 512) of the controller 100 and/or the controller 500.

In some instances, the control 1400 may include electrodes 1404 (e.g., capacitive sensors) spaced apart on the top 1402 to sense movement of the thumb. The electrodes 1404 may in some instances, detect initial movement of the thumb on the control 1400 prior to the control 1400 or the controller detecting movement of the control 1400. For example, in some instances, the control 1400 may include a "deadband" that is associated with a potentiometer of the controller detecting an initial movement of the control 1400. This deadband may be undetectable by the controller. That is, despite the user moving the control 1400 (e.g., the joystick) the controller may include a lag or "deadband." This initial movement of the control 1400 by the user may be undetected, or undetectable, by the controller before the control 1400 deflects a threshold amount. In such instances, the user may begin to deflect or move the control 1400 but a corresponding movement in the video game (e.g., cursor movement) may not occur until after a threshold amount of displacement detectable by the potentiometer.

As such, to detect this initial movement, the electrodes 1404 may be disposed within or on the top 1402 of the control 1400. The electrodes 1404 may detect an initial movement of the thumb and correlate the movement to within an application being operated by the controller. The electrodes 1404 may detect a direction of movement to control a corresponding aspect of a video game in accordance with the direction of movement of the control 1400. In some instances, the electrodes 1404 may continue to detect the movement (and/or direction) until the potentiometer is capable of detecting deflection of the thumbstick, after which the electrodes 1404 may be disabled or ignored. In this sense, the electrodes 1404 may sense movement of the control 1400 during a first period of time and before movement of the control 1400 is detected by the potentiometer. Thereafter, the potentiometer of the controller may sense movement during a second period of time and after the amount of movement of the control is greater than a threshold amount. In some instances, during the second period of time, the electrodes 1404 may be disabled and data generated by the electrodes 1404 may be ignored. However, in some instances, the controller 1400 may use a movement of the thumb (as detected by the electrodes 1404) and a movement of the joystick (as detected by the potentiometer) for controlling a movement. Accordingly, the electrodes 1404 and the potentiometer may be used in combination to sense a movement of the control and/or a movement of the thumb of the user.

In some instances, the electrodes 1404 may sense a movement of the thumb of the user as compared to a movement of the thumbstick. For example, as the thumb moves across the top 1402 of the control 1400, the electrodes 1404 may sense this movement and anticipate the movement of the control 1400 in a particular direction.

In some instances, the control 1400 or top 1402 of the control 1400 may include any number of electrodes 1404. For example, as shown in FIG. 14, the control 1400 may include an electrode located in the center and four electrodes radial disposed around the centrally located electrode. In some instances, the surrounding electrodes may be disposed near a periphery of the control 1400. However, in some instances, any number of electrodes 1404 may be used for detecting initial movement of the control 1400 and/or the thumb. For example, the control 1400 may include a single electrode located at the center and four electrodes disposed around the periphery and/or other locations on the control 1400.

FIG. 14 also illustrates a connector 1406 for communicatively coupling the control 1400 (or other controls) to processors of the controller. For example, the connector 1406 may provide movement data from the electrodes 1404 and/or a touch sensor disposed on the control 1400. In some instances, the control 1400 may represent a ball and socket type interface and the connector 1406 may be routed from within an interior of the control 1400 to hide portions of the connector 1406. In some instances, the connector 1406 may represent a flex circuit or wires that route on an interior side of the control 1400 up the top 1402, or portions of the control 1400 (e.g., the electrodes 1404, buttons, and so forth).

In some instances, the handheld controller may include a control having a trackpad as well as an electrode for determining an amount of force associated with a press(es). For example, to detect presses at the trackpad, the control or the handheld controller may include an electrode disposed under (e.g., vertically beneath) the trackpad. Force may be detected by a change in capacitance between the electrode and the capacitive array of the trackpad. As the user presses on areas of the trackpad (or a top surface of the control), with varying amounts of force, the trackpad may deflect and the amount of force may be sensed by a change in capacitance between the electrode and the capacitive array. In such instances, the trackpad may be manufactured from a flexible material to permit the trackpad to deflect towards the electrode, and accordingly, for the amount of force to be detected by the handheld controller or a remote device.

Figure 15A:
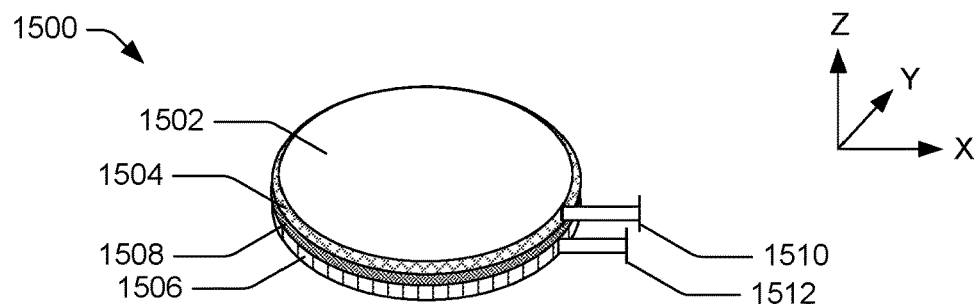
FIG. 15A illustrates a perspective view of an example control that includes, in part, a touch sensor for sensing touch input and a pressure sensor for sensing an amount of force associated with a press. In some instances, the amount of force may be sensed as a change in capacitance between the pressure sensor and the touch sensor.
Figure 15B:
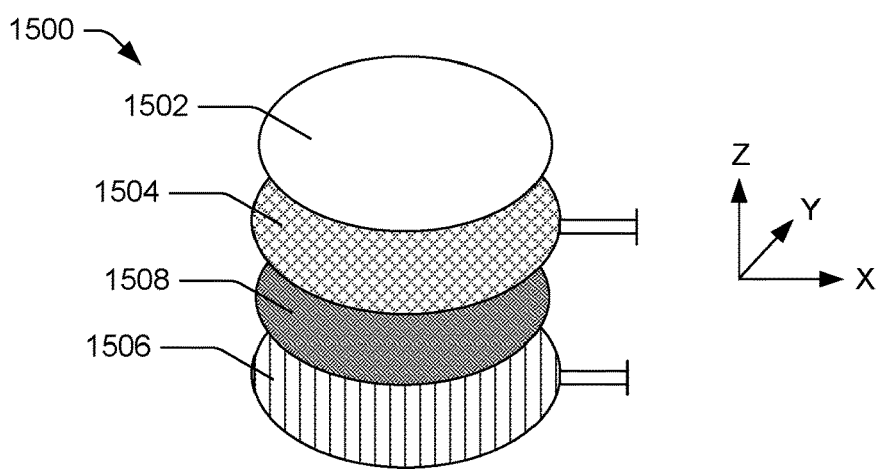
FIG. 15B illustrates an exploded view of the example control of FIG. 15A.
Figure 15C:
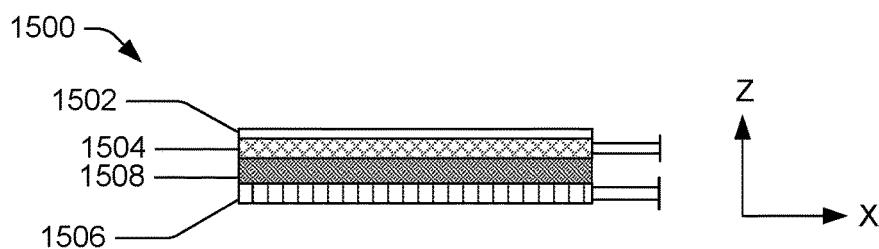
FIG. 15C illustrates a side view of the example control of FIG. 15A.

FIGS. 15A-15C illustrate an example control 1500 for sensing touch at the control 1500 and an amount of force associated with touches, or presses, at the control 1500. In some instances, the control 1500 may include a stack or layers of sensors for sensing presses and an amount of force associated with the presses. For example, the control 1500 may detect a presence, location, force, and/or gesture of a finger of a user. In some instances, the control 1500 may resemble, represent, and/or be used for, the trackpads (e.g., trackpad 108, trackpad 118, trackpad 508, trackpad 514) of the controller 100 and/or the controller 500, and/or the D-pad 110 of the controller 100 and/or the D-pad 510 of the controller 500.

FIG. 15A illustrates a compact, or assembled, view of the control 1500 showing a top cover 1502, a touch sensor 1504 (e.g., capacitive array), and/or pressure sensor 1506 (e.g., electrode). In some instances, the top cover 1502 may be disposed above the touch sensor 1504 and the pressure sensor 1506, and the touch sensor 1504 may be disposed above the pressure sensor 1506. Additionally, one or more insulator layers 1508 may be disposed between the touch sensor 1504 and the pressure sensor 1506. In some instances, the top cover 1502, the touch sensor 1504, the pressure sensor 1506, and/or the one or more insulator layers 1508 may be coupled together using adhesives.

Touches as sensed by the touch sensor 1504 may be transmitted to one or more processors of the controller via a first connector 1510, and an amount of force associated with the touches may be transmitted to one or more processors of the controller via a second connector 1512.

FIG. 15B illustrates an exploded view of the control 1500, showing the composition of the control 1500, including the top cover 1502, the touch sensor 1504, the pressure sensor 1506, and the one or more insulator layers 1508. FIG. 15C illustrates a side view of the control 1500. As discussed above, the control 1500 may include the touch sensor 1504 as well as the pressure sensor 1506 for determining an amount of force associated with press at the control 1500. In some instances, the pressure sensor 1506 may include an electrode, or multiple electrodes, configured to detect a change in capacitance with the touch sensor 1504. For example, in instances where the touch sensor 1504 includes a capacitive array, a change in capacitance between the capacitive array and the electrode may be correlated to an amount of force associated with the press. In this sense, a change in capacitance between the touch sensor 1504 and the pressure sensor 1506, as measured by the pressure sensor 1506, may be utilized to determine an amount of force associated with the press.

The touch sensor 1504 and/or the one or more insulator layers 1508 may deflect such that portions of the touch sensor 1504 may come into contact or move closer towards the pressure sensor 1506. For example, the touch sensor 1504 may move into a closer proximity with the pressure sensor 1506 in response to a user pressing on the control 1500. This movement, or the deflection of the touch sensor 1504 into proximity of the pressure sensor 1506, may result in a change in capacitance experienced by the touch sensor 1504 and/or the pressure sensor 1506. This change in capacitance may be associated with an amount of force for determining an amount of force the user presses on the control 1500. That is, as the user presses on areas of the touch sensor 1504 (or the top cover 1502), with varying amounts of force, the amount of force may be sensed by a change in capacitance between the electrode and the capacitive array.

The top cover 1502, the touch sensor 1504, and/or the insulator layers 1508 may be manufactured from a flexible material to permit deflection towards the pressure sensor 1506. Accordingly, the amount of force may be detected. Additionally, or alternatively the insulator layers may compress to allow the touch sensor 1504 to deflect towards the pressure sensor 1506. After the touch or press is removed, the top cover 1502, the pressure sensor 1506, and the insulator layers 1508 may return to their respective resting positions.

In some instances, although the pressure sensor 1506 is illustrated as a component of the control 1500, the pressure sensor 1506 may be a separate component, or removed from the control 1500. For example, the pressure sensor 1506 may be disposed within a body of the controller, beneath the touch sensor 1504. Here, the touch sensor 1504 may deflect towards the pressure sensor 1506 upon a user pressing against the touch sensor 1504. This deflection, or depression, of the touch sensor 1504 may bring the touch sensor 1504 into proximity or closer to the pressure sensor 1506. In some instances, the touch sensor 1504 and/or the pressure sensor 1506 may be substantially circular in shape and/or may be substantially the same size as one another.

Additionally, or alternatively, a rigid or stationary portion of the handheld controller (e.g., cover) may include elements for detecting an amount of force received at the control. For example, a portion of the handheld controller surrounding the control (e.g., an opening or receiver of the handheld controller) may include a metal layer, or metal elements. The capacitive sensor array of the trackpad of the control may detect an amount of force applied to the control as the capacitive sensor array moves away from the metal layer or the metal elements. For example, if the user presses on the control, the control may deflect downward into the handheld controller (e.g., into a controller body). This deflection may cause areas or portions of the trackpad to pull away from or be moved away from respective portions of the metal layer or respective metal elements. The capacitive sensor array of the trackpad (or another sensor) may detect a change of capacitance with the metal layer and/or the respective metal elements. Logic of the handheld controller system may then convert this change in capacitance, or the amount of capacitance, to an amount of force received at the trackpad. In other words, the deflection of the control may be used to determine an amount of force associated with the press of the trackpad.

Figure 16A:
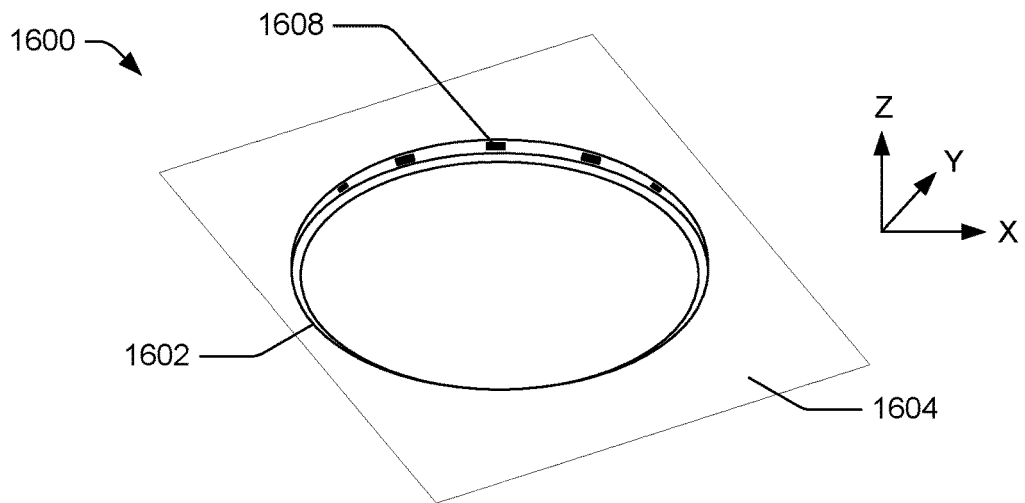
FIG. 16A illustrates a perspective view of an example control that includes, in part, a capacitive sensor for determining an amount of deflection relative to a stationary layer, such as a portion of a handheld controller surrounding the control. An amount of force associated with a press of the control may be determined by a capacitance change sensed between the capacitive sensor and the stationary layer.
Figure 16B:
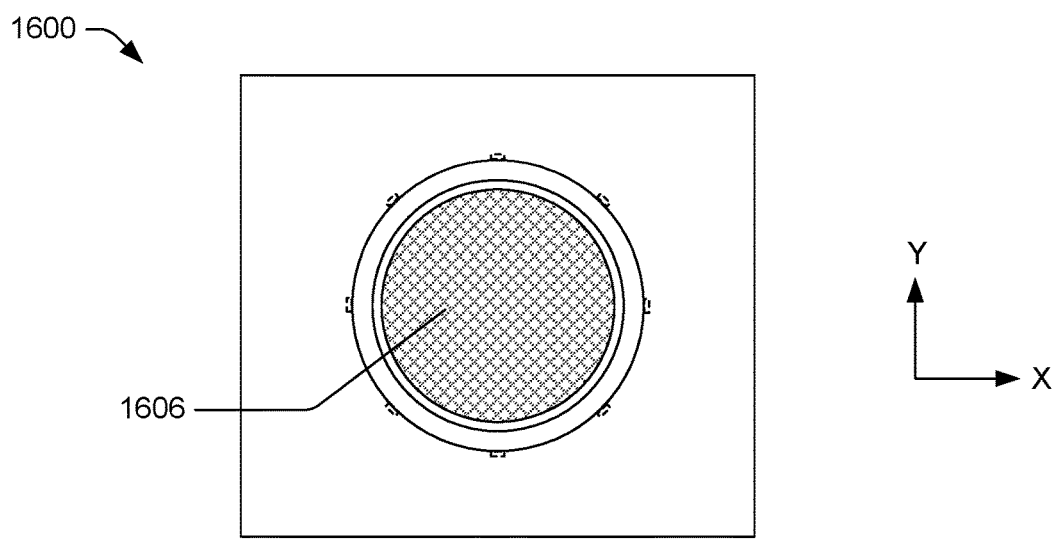
FIG. 16B illustrates a top view of the control of FIG. 16A.
Figure 16C:
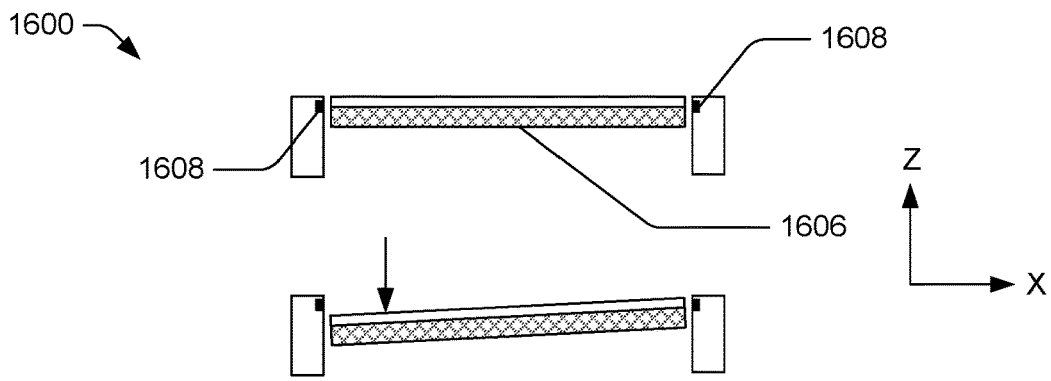
FIG. 16C illustrates a side view of the control of FIG. 16A, showing a deflection of the control relative to a stationary layer for determining an amount of force associated with a press of the control.

FIGS. 16A-16C illustrate a control 1600 disposed within a receptacle 1602 of a controller 1604. In some instances, the control 1600 may include a touch sensor 1606 (e.g., trackpad) for sensing touch. Additionally, the control 1600 may include capabilities for determining an amount of force associated with touches or presses at the control 1600. In some instances, the control 1600 may resemble, represent, and/or be used for, the trackpads (e.g., trackpad 108, trackpad 118, trackpad 508, trackpad 514) of the controller 100 and/or the controller 500, and/or the D-pad 110 of the controller 100 and/or the D-pad 510 of the controller 500.

As shown, the control 1600 may reside within the receptacle 1602 and may be disposed on a front of the controller 1604. In some instances, the controller 1604 or portions of the receptacle 1602 may include components for determining an amount of deflection experienced by the control 1600. For example, metal elements 1608 may be disposed around the control 1600, within a sidewall of the receptacle 1602. Additionally, or alternatively, a portion of the controller 1604 surrounding the receptacle 1602 may include a metal layer. Whether embodied as the metal elements 1608, or a metal layer, the metal elements 1608 or a metal layer may be disposed on a rigid or stationary portion of the controller 1604 and may surrounding the control 1600. For example, the metal elements 1608 or the metal layer may be disposed within a top cover of the controller 1604, around the receptacle 1602.

The touch sensor 1606 may include a capacitive sensor array that is operable to detect an amount of force at the controller 1604. For example, as portions of the touch sensor 1606 move away from the metal elements 1608 (or the metal layer) a corresponding change in capacitance may be sensed. For example, as shown in FIG. 16C if the user presses on the touch sensor 1606, the portion of the touch sensor 1606 where the user touches may deflect downward into the receptacle 1602 (or the controller 1604). This deflection may cause areas or portions of the touch sensor 1606 to move away from or be disposed away from respective metal elements 1608 (or the metal layer). The touch sensor 1606 (or the capacitive pads of the touch sensor) may detect a change of capacitance between the metal elements 1608 and logic of the handheld controller may convert this change in capacitance to an amount of force received at the control 1600. In other words, the amount of deflection of the touch sensor 1606 may be used to determine an amount of force associated with the press.

Figure 17:
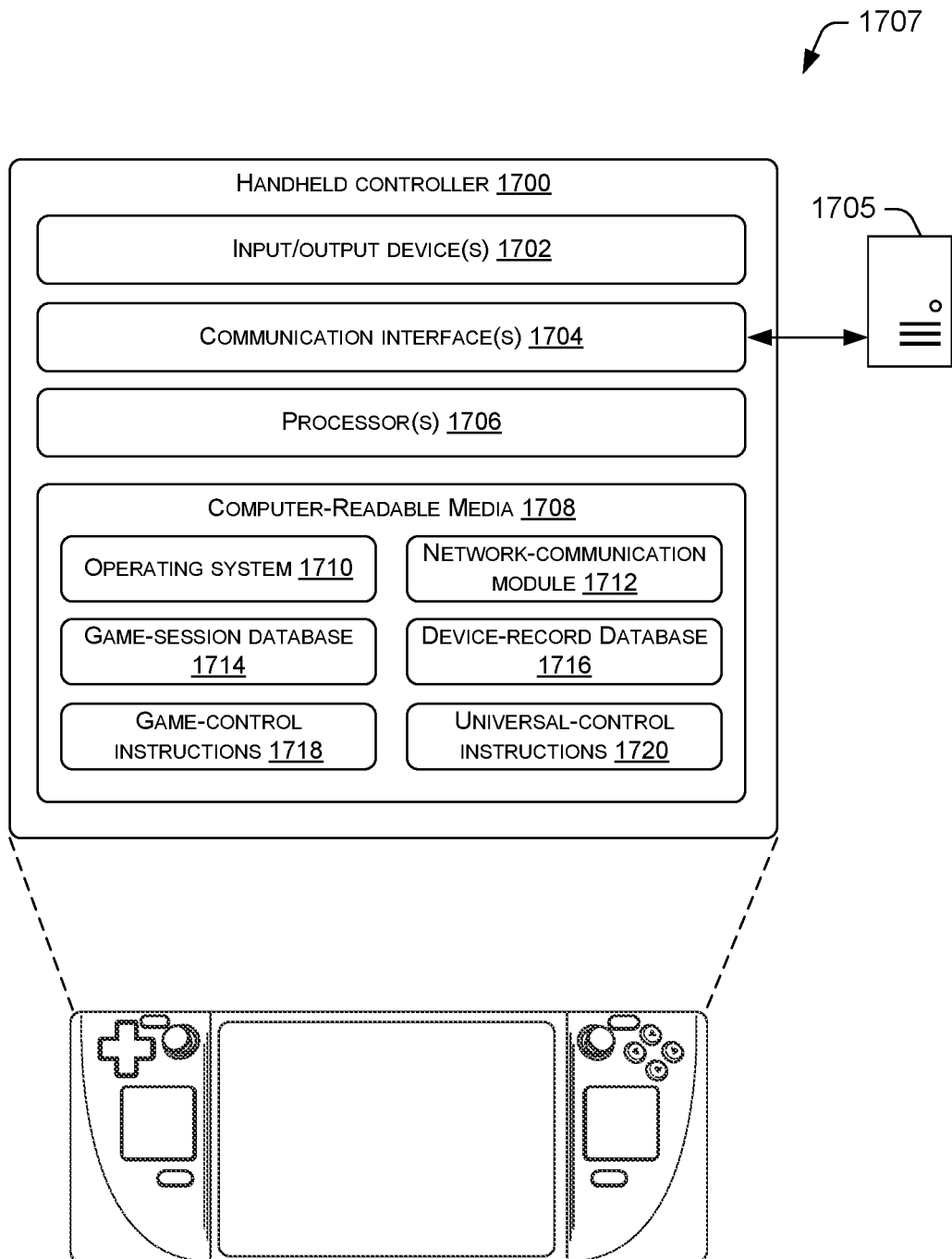
FIG. 17 illustrates example functional components of an example handheld controller.

FIG. 17 illustrates example computing components of a controller 1700, such as the controller 100 and/or the controller 500. As illustrated, the controller includes one or more input/output (I/O) devices 1702, such as the controls described above (e.g., joysticks, trackpads, triggers, etc.), potentially any other type of input or output devices. For example, the I/O devices 1702 may include one or more microphones to receive audio input, such as user voice input. In some implementations, one or more cameras or other types of sensors (e.g., inertial measurement unit (IMU)) may function as input devices to receive gestural input, such as motion of the handheld controller. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on and/or functionalities of the controller (e.g., modes). While a few examples have been provided, the controller may additionally or alternatively include any other type of output device.

In some instances, output by the one or more output devices may be based on input received by one or more of the input devices. For example, selection of a control may result in the output of a haptic response by a vibrator located adjacent (e.g., underneath) the control or at any other location. In some instances, the output may vary based at least in part on a characteristic of a touch input on a touch sensor, such as the touch sensor associated with the control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the control may result in a first type of haptic output, while a tap on the control (detected by the touch sensor) may result in a second type of haptic output, while a hard press of the control may result in a third type of haptic output. Additionally, certain controls or portions of the controls may be illuminated based on received inputs.

In addition, the handheld controller 1700 may include one or more communication interfaces 1704 to facilitate a wireless connection to a network and/or to one or more remote systems and/or devices 1705 (e.g., a host computing device executing an application, a game console, etc.). The communication interfaces 1704 may implement one or more of various wireless technologies, such as Wi-Fi, Bluetooth, radio frequency (RF), and so on. It is to be appreciated that the handheld controller 1700 may further include physical ports to facilitate a wired connection to a network, a connected peripheral device, or a plug-in network device that communicates with other wireless networks.

In the illustrated implementation, the handheld controller 1700 further includes one or more processors 1706 and computer-readable media 1708. In some implementations, the processors(s) 1706 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1706 may possess its own local memory, which also may store program modules, program data, and/or one or more operating systems.

The computer-readable media 1708 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1708 may be implemented as computer-readable storage media ("CRSM"), which may be any available physical media accessible by the processor(s) 1706 to execute instructions stored on the computer-readable media 1708. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1706.

Several modules such as instruction, datastores, and so forth may be stored within the computer-readable media 1708 and configured to execute on the processor(s) 1706. A few example functional modules are shown as stored in the computer-readable media 1708 and executed on the processor(s) 1706, although the same functionality may alternatively be implemented in hardware, firmware, or as a system on a chip (SOC).

An operating system module 1710 may be configured to manage hardware within and coupled to the handheld controller for the benefit of other modules. In addition, the computer-readable media 1708 may store a network-communications module 1712 that enables the handheld controller to communicate, via the communication interfaces 1404, with one or more other devices 1705, such as a personal computing device executing an application (e.g., a game application), a game console, a remote server, or the like. The computer-readable media 1708 may further include a game-session database 1714 to store data associated with a game (or other application) executing on the controller or on a computing device to which the controller couples. The computer-readable media 1708 may also include a device-record database 1716 that stores data associated with devices to which the controller couples, such as the personal computing device, game console, remote server or the like. The computer-readable media 1708 may further store game-control instructions 1718 that configure the controller to function as a gaming controller, and universal-control instructions 1720 that configure the handheld controller to function as a controller of other, non-gaming devices.

In some instances, some or all of the components (software) shown in FIG. 17 could be implemented on another computing device(s) 1705 that is part of a controller system 1707 including the controller. In such instances, the processes and/or functions described herein may be implemented by other computing devices 1705 and/or the controller 1700. By way of example, the controller 1700 may couple to a host PC or console in the same environment, a computing device(s)/server and provide the device 1705 with data indicating presses, selections, and so forth received at the controller 1700. The controller 1700, for example, may transmit data indicating touch inputs received at a trackpad of the controller to the computing devices, and the computing devices may determine characteristics of the data and/or where the touch input is received on the controller (or the control of the controller). The computing device 1705 may then cause associated actions within a game or application to be performed. In another example, the computing device 1705 may receive data indicating an amount of strain detected at strain gauges on a control (e.g., the control 1300). The computing device may determine, based on the data, the strain experienced and a corresponding position of the thumbstick 1304. The position of the thumbstick may then be used to control a gaming application. However, while a few scenarios are described, the controller and the computing device(s) 1705 may communicatively couple with one another for transmitting and receiving data such that the controller 1700, the computing device 1705, and/or other devices of the controller system 1707 may perform the operations and processes described herein.

EXAMPLE CLAUSES

1. A controller system including: one or more processors; and a controller including: a controller body having a front surface; and a control residing on the front surface of the controller body, the control including: a top cover; a touch sensor adjacent to the top cover and configured to provide, to the one or more processors, touch data indicative of a touch input at the top cover; a first switch residing at least partly beneath the top cover and configured to provide, to the one or more processors, first selection data indicative of a first selection based on a first press of a first actuatable area of the top cover; and a second switch residing at least partly beneath the top cover and configured to provide, to the one or more processors, second selection data indicative of a second selection based on a second press of a second actuatable area of the top cover.

2. The controller system of clause 1, wherein: the control includes a circular trackpad; the first switch includes a first tactile switch; the second switch includes a second tactile switch; the controller further includes a third tactile switch and a fourth tactile switch; and the first tactile switch, the second tactile switch, the third tactile switch, and the fourth tactile switch are equidistantly spaced around a periphery of the circular trackpad, beneath individual actuatable areas of the top cover.

3. The controller system of clause 1, further including a pressure sensor configured to provide, to the one or more processors, at least one of: first force data indicative of an amount of force of the first press; or second force data indicative of an amount of force of the second press.

4. The controller system of clause 3, wherein: the pressure sensor includes a first pressure sensor and a second pressure sensor; the first pressure sensor is configured to provide the first force data indicative of the amount of force of the first press; and the second pressure sensor is configured to provide the second force data indicative of the amount of force of the second press.

5. The controller system of clause 1, further including light emitting elements, and wherein: the control includes at least one of openings, a cutout, or a thinned region; and light emitted by the light emitting elements is configured to emit though the at least one of the openings, the cutout, or the thinned region to indicate a first location of the first switch and a second location of the second switch.

6. The controller system of clause 1, wherein the control is configured to function as a directional pad (D-pad).

7. The controller system of clause 6, further including light emitting diodes, and wherein: the controller is configured to illuminate to a first state to indicate that the control is configured as a trackpad; and the controller is configured to illuminate to a second state to indicate that the control is configured as a D-pad.

8. The controller system of clause 1, further including a lockout mechanism, wherein the lockout mechanism functions to prevent the control from being depressed.

9. A controller system including: one or more processors; and a controller including: a controller body having a front surface; and a control residing on the front surface of the controller body, the control including: a circular trackpad configured to provide, to the one or more processors, touch data indicative of a touch input, wherein the circular trackpad includes a cutout; a directional pad (D-pad) disposed within the cutout of the circular trackpad; a first switch residing at least partly beneath a first actuatable area of the D-pad and configured to provide, to the one or more processors, first selection data indicative of a first selection based on a first press of the first actuatable area; and a second switch residing at least partly beneath a second actuatable area of the D-pad and configured to provide, to the one or more processors, second selection data indicative of a second selection based on a second press of the second actuatable area.

10. The controller system of clause 9, wherein: the circular trackpad includes a first touch sensor configured to provide, to the one or more processors, the touch data indicative of the touch input; and the D-pad includes a second touch sensor configured to provide, to the one or more processors, additional touch data indicative of the touch input.

11. The controller system of clause 10, wherein: the first touch sensor includes a substantially circular shape with a substantially cross-shaped cutout, the first touch sensor being disposed around the D-pad; and the second touch sensor is substantially cross-shaped, the second touch sensor being disposed on the D-pad.

12. The controller system of clause 10, wherein the first touch sensor and the second touch sensor collectively form a substantially circular-shaped touch sensor of the control.

13. The controller system of clause 9, wherein: a surface of the D-pad is substantially co-planar with a surface of the circular trackpad; the surface of the D-pad is disposed above the surface of the circular trackpad; or the surface of the D-pad is disposed beneath the surface of the circular trackpad.

14. The controller system of clause 9, further including light emitting components disposed beneath the circular trackpad and the D-pad, wherein the light emitting components are arranged to emit light through first openings arranged around the circular trackpad or second openings arranged around the D-pad.

15. The controller system of clause 9, further including first light emitting components disposed beneath the circular trackpad and second light emitting components disposed beneath the D-pad, wherein: the first light emitting components are configured to emit light during a first mode during use of the circular trackpad; and the second light emitting components are configured to emit light during a second mode during use of the D-pad.

16. A controller including: a controller body having a front surface; and a control residing on the front surface of the controller body, the control including: a circular-shaped base frame; a joystick; a first member coupled to the joystick, the first member being configured to flex; a housing disposed around the first member, wherein the housing couples to a first end of the first member and a second end of a second member; a second member coupled to the circular-shaped base frame and the housing, the second member being configured to flex; and a third member coupled to the circular-shaped base frame and the housing, the third member being configured to flex.

17. The controller of clause 16, wherein: the second member couples to a first side of the circular-shaped base frame and a first side of the housing; and the third member couples to a second side of the circular-shaped base frame and a second side of the housing, the second side of the circular-shaped base frame being directly opposite the first side of the circular-shaped base frame.

18. The controller of clause 16, further including a touch sensor disposed on a top of the joystick and configured to provide, to one or more processors, touch data indicative of a touch input.

19. The controller of clause 16, further including at least one of: one or more first strain gauges disposed on the first member, the one or more first strain gauges measuring a degree of flexure of the first member, wherein the one or more first strain gauges are configured to provide, to one or more processors, data indicating the degree of flexure of the first member; one or more second strain gauges disposed on the second member, the one or more second gauges measuring a degree of flexure of the second member, wherein the one or more second strain gauges are configured to provide, to the one or more processors, data indicating the degree of flexure of the second member; or one or more third strain gauges disposed on the third member, the one or more third strain gauges measuring a degree of flexure of the third member, wherein the one or more third strain gauges are configured to provide, to the one or more processors, data indicating the degree of flexure of the third member.

20. The controller of clause 16, wherein collectively, the first member, the second member, and the third member provide the joystick with 360 degrees of rotation.

21. The controller of clause 16, wherein a cross section of at least of the first member, the second member, or the third member is at least one of: cylindrical, cross-shaped, or T-shaped.

22. The controller of clause 16, wherein the joystick is substantially centered within the circular-shaped base frame.

23. A controller system including: one or more processors; and a controller including: a controller body having a front surface; and a control residing on the front surface of the controller body, the control including: a thumbstick; a first capacitive electrode disposed at a center of the thumbstick, the first capacitive electrode configured to sense a thumb of a user and provide, to the one or more processors, first data indicative of the thumb; and one or more second capacitive electrodes disposed around the center of the thumbstick, the one or more second capacitive electrodes configured to sense the thumb of the user and provide, to the one or more processors, second data indicative of the thumb.

24. The controller system of clause 23, further including a potentiometer, and wherein the first capacitive electrode and the one or more second capacitive electrodes are configured to sense a first movement of the thumb prior to the potentiometer sensing a second movement of the thumbstick.

25. The controller system of clause 24, wherein: the potentiometer is configured to sense the second movement of the thumbstick after a threshold amount of the second movement; and based at least in part on detecting the threshold amount of second movement, the one or more processors are configured to cause at least one of the first capacitive electrode or the one or more second capacitive electrodes to be disabled.

26. The controller system of clause 23, wherein the one or more processors are configured to determine a direction of movement of the thumb based at least in part on the first data and the second data.

27. The controller system of clause 26, wherein the one or more processors are configured to provide the direction of movement to a communicatively coupled computing device.

28. The controller of clause 23, wherein the one or more second capacitive electrodes include four capacitive electrodes, wherein the four capacitive electrodes are radially spaced around the first capacitive electrode.

29. The controller system of clause 23, further including a potentiometer, and wherein: the first capacitive electrode and the one or more second capacitive electrodes are configured to sense first movement of the thumb during a first period of time; and the potentiometer is configured to sense second movement of the thumbstick during a second period of time that is after the first period of time.

30. A controller system including: one or more processors; and a controller including: a controller body having a front surface; an opening defined in the front surface of the controller body; and a control residing within the opening and on the front surface of the controller body, the control including: a top cover, a touch sensor disposed adjacent to the top cover and configured to provide, to the one or more processors, touch data indicative of a touch input at the top cover, and an electrode disposed adjacent to the touch sensor, wherein the touch sensor is configured to flex towards the electrode in response to the touch input at the top cover, and wherein the electrode is configured to provide, to the one or more processors, data indicative of a change in capacitance as the touch sensor flexes towards the electrode.

31. The controller system of clause 30, wherein the change in capacitance is indicative of an amount of force of the touch input received at the top cover.

32. The controller system of clause 30, further including at least one insulating layer disposed between the touch sensor and the electrode, wherein the at least one insulating layer is configured to flex or compress.

33. A controller system including: one or more processors; and a controller including: a controller body having a front surface; an opening defined in the front surface of the controller body; a metal element disposed at least one of around or within the opening; and a control residing within the opening and on the front surface of the controller body, the control including: a top cover; and a touch sensor adjacent to the top cover, the touch sensor configured to flex in response to a press applied to the top cover, and to provide, to the one or more processors, data indicative of an amount of force of the press based at least in part on a change in capacitance between the touch sensor and the metal element.

34. The controller system of clause 33, wherein on the press applied to the top cover causes the touch sensor to be disposed away from at least a portion of the metal element by a distance, and wherein the distance is associated with the amount of force.

35. The controller system of clause 33, wherein the metal element includes a metal layer embedded with the controller body.

36. The controller system of clause 33, wherein the metal element includes a plurality of metal elements disposed around the opening.

37. The controller system of clause 33, further including a switch residing at least partly beneath the top cover and configured to provide, to the one or more processors, selection data indicative of a selection based on the press applied to the top cover.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A controller system comprising:
   one or more processors; and
   a controller comprising:
      a housing having an opening defined therein; and
      a trackpad disposed within the opening defined in the housing, the trackpad comprising:
         a cover;
         a touch sensor disposed underneath, and coupled to, the cover, wherein the touch sensor is configured to provide, to the one or more processors, touch data indicative of an object touching the cover;
         a carrier disposed underneath the touch sensor and coupled to the cover;
         at least one biasing member coupled to the carrier and to the housing, wherein a center portion of the at least one biasing member comprises one or more holes configured to receive corresponding projections extending from a rear side of the carrier, wherein the at least one biasing member biases a portion of the cover against an inner surface of the housing and is configured to deflect in response to the object pressing on the cover;
         a metal layer disposed underneath, and coupled to, the carrier; and
         a pressure sensor coupled to the housing and disposed underneath, and spaced a distance from, the metal layer, wherein the pressure sensor is configured to provide, to the one or more processors, force data indicative of an amount of force of a press on the cover based at least in part on a proximity of the metal layer to the pressure sensor.

2. The controller system of claim 1, wherein the metal layer comprises copper foil.

3. The controller system of claim 1, wherein the metal layer is attached to a bottom surface of the carrier.

4. The controller system of claim 1, wherein the trackpad further comprises a haptic actuator disposed underneath the touch sensor and configured to provide haptic feedback in response to the amount of the force of the press satisfying a threshold.

5. The controller system of claim 4, wherein the at least one biasing member is a first anisotropic spring coupled to a first side of the carrier, and wherein the trackpad further comprises:
   a second anisotropic spring coupled to the housing and to a second side of the carrier opposite the first side,
   wherein the second anisotropic spring is configured to deflect in response to the object pressing on the cover, and
   wherein the first anisotropic spring and the second anisotropic spring are configured to deflect in response to the haptic feedback provided by the haptic actuator.

6. The controller system of claim 1, wherein the force data comprises capacitance values that vary in response to variable proximity of the metal layer relative to the pressure sensor.

7. The controller system of claim 1, wherein the pressure sensor comprises a substrate including an electrode configured to measure a change in capacitance based on movement of the metal layer relative to the pressure sensor.

8. A controller system comprising:
   one or more processors; and
   a controller comprising:
      a housing; and
      a control configured to be operated by a finger, the control comprising:
         a cover;
         a touch sensor disposed underneath, and coupled to, the cover, wherein the touch sensor is configured to provide, to the one or more processors, touch data indicative of the finger touching the cover;
         a carrier disposed underneath the touch sensor and coupled to the cover;
         at least one biasing member coupled to the carrier and to the housing, wherein a center portion of the at least one biasing member comprises one or more holes configured to receive corresponding projections extending from a rear side of the carrier, wherein the at least one biasing member is configured to apply a biasing force on the carrier in an opposite direction to that of a force of a press of the finger on the cover;
         a metal layer disposed underneath, and coupled to, the carrier; and
         a pressure sensor coupled to the housing and disposed underneath, and spaced a distance from, the metal layer, wherein the pressure sensor is configured to provide, to the one or more processors, force data indicative of an amount of the force of the press of the finger on the cover based at least in part on a proximity of the metal layer to the pressure sensor.

9. The controller system of claim 8, wherein the carrier is configured to deflect towards the pressure sensor in response to the finger pressing on the cover, and wherein the metal layer is configured to deflect towards the pressure sensor in response to the carrier deflecting towards the pressure sensor.

10. The controller system of claim 8, wherein the metal layer comprises copper foil.

11. The controller system of claim 8, wherein the control further comprises a haptic actuator disposed underneath the touch sensor and configured to provide haptic feedback in response to the amount of the force of the press satisfying a threshold.

12. The controller system of claim 8, wherein the control comprises a trackpad.

13. The controller system of claim 8, wherein the at least one biasing member biases a portion of the cover against an inner surface of the housing.

14. The controller system of claim 8, wherein the distance the pressure sensor is spaced from the metal layer is at least about 0.5 millimeters (mm).

15. The controller system of claim 8, wherein the controller further comprises a thumbstick comprising:
  a potentiometer configured to sense a deflection of the thumbstick; and
  capacitive sensors disposed in or on a top of the thumbstick, the capacitive sensors configured to sense movement of a thumb on the top of the thumbstick prior to the potentiometer sensing the deflection of the thumbstick.

16. A trackpad of a controller, the trackpad comprising:
  a cover;
  a touch sensor disposed underneath, and coupled to, the cover, wherein the touch sensor is configured to output touch data indicative of a touch on the cover;
  a carrier disposed underneath the touch sensor and coupled to the cover;
  at least one biasing member coupled to the carrier and to a housing of the controller, wherein a center portion of the at least one biasing member comprises one or more holes configured to receive corresponding projections extending from a rear side of the carrier, wherein the at least one biasing member is configured to apply a biasing force on the carrier in an opposite direction to that of a force of a press on the cover;
  a metal layer disposed underneath, and coupled to, the carrier; and
  a pressure sensor coupled to the housing and disposed underneath, and spaced a distance from, the metal layer, wherein the pressure sensor is configured to output force data indicative of an amount of force of the press on the cover based at least in part on a proximity of the metal layer relative to the pressure sensor.

17. The trackpad of claim 16, wherein the force data comprises capacitance values that vary in response to variable force of the press on the cover.

18. The trackpad of claim 16, wherein the metal layer is attached to a bottom surface of the carrier.

19. The trackpad of claim 16, wherein the trackpad further comprises a haptic actuator disposed underneath the touch sensor and configured to vibrate in response to the amount of the force of the press satisfying a threshold.

20. The trackpad of claim 16, wherein the at least one biasing member is a first spring coupled to a first side of the carrier, and wherein the trackpad further comprises:
  a second spring coupled to the housing and to a second side of the carrier opposite the first side,
  wherein the second spring is configured to apply a second biasing force on the carrier in the opposite direction to that of the force of the press on the cover.

21. The trackpad of claim 16, wherein an air gap is disposed between the metal layer and the pressure sensor to allow the cover, the carrier, and the metal layer to deflect towards the pressure sensor in response to the press on the cover.

* * * * *